US012659277B2

(12) United States Patent
Bafna et al.

(10) Patent No.: US 12,659,277 B2
(45) Date of Patent: Jun. 16, 2026

(54) USE CASE AWARE NETWORK TRAFFIC SHAPING TECHNIQUES FOR POWER REDUCTION

(71) Applicant: QUALCOMM Incorporated, San Diego, CA (US)

(72) Inventors: Saket Kumar Bafna, Bangalore (IN); Waiss Kharni S M, Bangalore (IN); Abhishek Ranka, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 18/772,983

(22) Filed: Jul. 15, 2024

(65) Prior Publication Data

US 2026/0019369 A1      Jan. 15, 2026

(51) Int. Cl.
  *H04L 47/22*       (2022.01)
  *H04L 47/28*       (2022.01)
      (Continued)

(52) U.S. Cl.
  CPC .............. *H04L 47/22* (2013.01); *H04L 47/28* (2013.01); *H04W 28/0221* (2013.01); *H04W 28/10* (2013.01)

(58) Field of Classification Search
  CPC .... H04L 47/22; H04L 47/28; H04W 28/0221; H04W 28/10
      (Continued)

(56) References Cited

U.S. PATENT DOCUMENTS

| 2018/0376464 A1* | 12/2018 | Hosseini | ............... H04L 5/0064 |
| 2020/0120536 A1* | 4/2020 | Prakash | .................. H04L 47/83 |

(Continued)

FOREIGN PATENT DOCUMENTS

| CN | 108781143 B | * 10/2021 | ............ H04W 72/21 |
| WO | WO-2023029016 A1 | 3/2023 | |

(Continued)

OTHER PUBLICATIONS

International Search Report and Written Opinion PCT/US2025/037557 ISA/EPO Nov. 14, 2025.

(Continued)

*Primary Examiner* — Ruolei Zong
(74) *Attorney, Agent, or Firm* — Holland & Hart LLP

(57) ABSTRACT

This disclosure provides systems, methods and apparatus, including computer programs encoded on computer storage media, for use case aware network traffic shaping techniques for power reduction. An AR device may align a set of transmission periodicities associated with a set of transmission types to a common periodicity corresponding to a master transmission type of the set of transmission types based on a modification to at least one transmission periodicity of the set of transmission periodicities. A UE may align a set of transmission periodicities associated with a set of transmission types to a common periodicity, where a packet size associated with a transmission type may be based on a latency threshold associated with the transmission type. The UE may buffer one or more transmissions of a set of transmissions corresponding to the set of transmission types prior to performing packetization associated with at least one transmission.

30 Claims, 14 Drawing Sheets

(51) Int. Cl.
　　*H04W 28/02*　　　(2009.01)
　　*H04W 28/10*　　　(2009.01)
(58) Field of Classification Search
　　USPC ........................................................ 709/224
　　See application file for complete search history.

(56) References Cited

U.S. PATENT DOCUMENTS

| | | | |
|---|---|---|---|
| 2020/0153554 A1* | 5/2020 | Nguyen ................ | H04W 72/23 |
| 2022/0294555 A1 | 9/2022 | Liu et al. | |
| 2023/0065594 A1 | 3/2023 | Chan et al. | |
| 2023/0146014 A1* | 5/2023 | Mondet ................. | H04L 5/0048 |
| | | | 370/329 |
| 2023/0199600 A1* | 6/2023 | Xu ......................... | H04W 72/54 |
| | | | 370/331 |
| 2023/0292270 A1 | 9/2023 | Hande et al. | |
| 2023/0292321 A1 | 9/2023 | Meylan et al. | |
| 2024/0147477 A1* | 5/2024 | Rao ......................... | H04W 72/20 |
| 2025/0048421 A1* | 2/2025 | Li .......................... | H04L 5/0078 |
| 2025/0119785 A1* | 4/2025 | Rao .................... | H04W 28/0236 |

FOREIGN PATENT DOCUMENTS

| | | | |
|---|---|---|---|
| WO | WO-2023133900 A1 | 7/2023 | |
| WO | WO-2023154845 A1 * | 8/2023 | ........ H04W 28/0236 |
| WO | WO-2023212460 | 11/2023 | |
| WO | WO-2024064488 | 3/2024 | |

OTHER PUBLICATIONS

Tano R (Ericsson)., et al., "Discussion on Multi-Modality", 3GPP TSG-RAN WG2 Meeting #126, R2-2404512, Type Discussion, NR_XR_PH3-CORE, 3rd Generation Partnership Project (3GPP), Mobile Competence Centre, 650, Route Des Lucioles, F-06921 Sophia-antipolis Cedex, France, vol. RAN WG2, No. Fukuoka City, Fukuoka, JP, May 20, 2024-May 24, 2024, May 9, 2024, 7 Pages, XP052606965, section 2.

VIVO: "Enhanced Support for XR Services in Ref-18", 3GPP TSG RAN Rel-18 workshop, RWS-210164, 3rd Generation Partnership Project (3GPP), Mobile Competence Centre, 650, Route Des Lucioles, F-06921 Sophia-Antipolis Cedex, France, vol. TSG RAN, No. Electronic Meeting, Jun. 28, 2021-Jul. 2, 2021, Jun. 7, 2021, 15 Pages, XP052025723, slide 8.

Zhang Y (Xiaomi)., et al., "Configured Grant Enhancements for XR", 3GPP TSG-RAN WG2 Meeting #124, R2-2311783, Type Discussion, NR_XR_ENH-CORE, 3rd Generation Partnership Project (3GPP), Mobile Competence Centre, 650, Route Des Lucioles, F-06921 Sophia-Antipolis Cedex, France, vol. RAN WG2, No. Chicago, US, Nov. 13, 2023-Nov. 17, 2023, Nov. 3, 2023, 4 Pages, XP052534203, section 2.2.

* cited by examiner

AR Device

Align a Set of Transmission
Periodicities to a Common
Periodicity                    710

Identify One or More
Threshold Latency Tolerances
Associated with Each
Transmission Type                    715

Identify a Smallest Threshold
Latency Tolerance                    720

One or More Transmissions of One or
More Transmission Types

725

Additional Transmission

730

700

130          105          115

Network
Entity

Transceiver          Antenna 1010          1015

Memory

Code

1030

Communications
Manager          1025

1020

1040          Processor

1035

1005

1000

Align a set of transmission periodicities associated with a set of respective transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types

1305

Transmit one or more transmissions corresponding to one or more respective transmission types of the set of transmission types at the common periodicity and according to the smallest threshold latency tolerance

1310

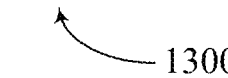

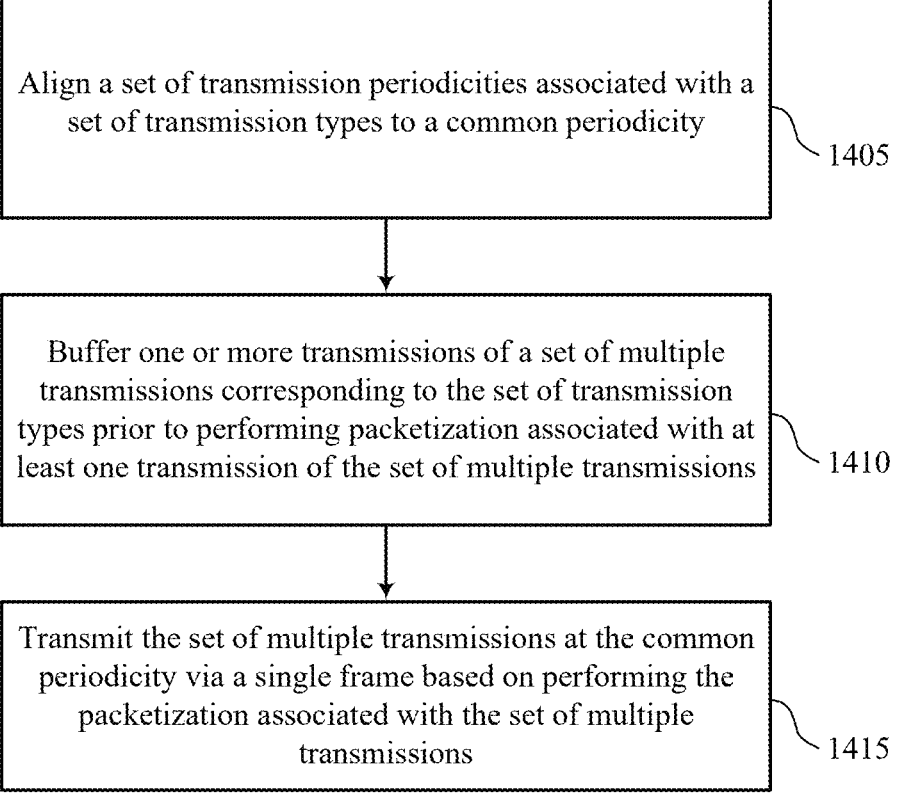

Align a set of transmission periodicities associated with a set of transmission types to a common periodicity

1405

Buffer one or more transmissions of a set of multiple transmissions corresponding to the set of transmission types prior to performing packetization associated with at least one transmission of the set of multiple transmissions

1410

Transmit the set of multiple transmissions at the common periodicity via a single frame based on performing the packetization associated with the set of multiple transmissions

USE CASE AWARE NETWORK TRAFFIC SHAPING TECHNIQUES FOR POWER REDUCTION

TECHNICAL FIELD

This disclosure relates to wireless communications, including use case aware network traffic shaping techniques for power reduction.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-s-OFDM). A wireless multiple-access communications system may include one or more base stations (BSs) or one or more network access nodes, each simultaneously supporting communication for multiple communication devices, which may be otherwise known as user equipment (UE).

SUMMARY

The systems, methods, and devices of this disclosure each have several innovative aspects, no single one of which is solely responsible for the desirable attributes disclosed herein.

A method by wireless device is described. The method may include aligning a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types and transmitting one or more transmissions corresponding to one or more respective transmission types of the set of transmission types at the common periodicity and according to the smallest threshold latency tolerance.

A wireless device is described. The wireless device may include one or more memories storing processor executable code, and one or more processors coupled with the one or more memories. The one or more processors may individually or collectively be operable to execute the code to cause the wireless device to align a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types and transmit one or more transmissions corresponding to one or more respective transmission types of the set of transmission types at the common periodicity and according to the smallest threshold latency tolerance.

Another wireless device is described. The wireless device may include means for aligning a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types and means for transmitting one or more transmissions corresponding to one or more respective transmission types of the set of transmission types at the common periodicity and according to the smallest threshold latency tolerance.

A non-transitory computer-readable medium storing code is described. The code may include instructions executable by one or more processors to align a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types and transmit one or more transmissions corresponding to one or more respective transmission types of the set of transmission types at the common periodicity and according to the smallest threshold latency tolerance.

In some examples of the method, wireless devices, and non-transitory computer-readable medium described herein, transmitting the one or more transmissions may include operations, features, means, or instructions for generating first data associated with the master transmission type, where a first transmission of the one or more transmissions includes the first data, where transmitting the one or more transmissions includes transmitting the first data associated with the master transmission type and at least second data associated with a second transmission type of the set of transmission types at a transmission timing corresponding to the first data.

Some examples of the method, wireless devices, and non-transitory computer-readable medium described herein may further include operations, features, means, or instructions for identifying one or more threshold latency tolerances associated with each transmission type of the set of transmission types and transmitting an additional transmission corresponding to a first transmission type of the one or more respective transmission types based on a determination that a respective threshold latency tolerance of the one or more threshold latency tolerances associated with the first transmission type of the one or more respective transmission types may have been exceeded.

Some examples of the method, wireless devices, and non-transitory computer-readable medium described herein may further include operations, features, means, or instructions for synchronizing the one or more transmissions corresponding to the one or more respective transmission types based on a data availability associated with the master transmission type, where the one or more transmissions may be phase aligned based on the synchronizing.

Some examples of the method, wireless devices, and non-transitory computer-readable medium described herein may further include operations, features, means, or instructions for merging concurrent data corresponding to the one or more transmissions into a single message, where transmitting the one or more transmissions includes transmitting the single message.

In some examples of the method, wireless devices, and non-transitory computer-readable medium described herein, a packet size associated with the one or more transmissions may be based on a threshold transmit unit size and the packet size does not exceed the threshold transmit unit size.

In some examples of the method, wireless devices, and non-transitory computer-readable medium described herein, transmitting the one or more transmissions may include operations, features, means, or instructions for transmitting the one or more transmissions via a single Wi-Fi frame.

Some examples of the method, wireless devices, and non-transitory computer-readable medium described herein may further include operations, features, means, or instructions for increasing the smallest threshold latency tolerance associated with the master transmission type based on a deep learning based prediction model output corresponding to the master transmission type.

Some examples of the method, wireless devices, and non-transitory computer-readable medium described herein may further include operations, features, means, or instructions for adjusting data generation timing associated with a subset of transmission types to align with a transmission time associated with the master transmission type based on the common periodicity, where transmitting the one or more transmissions associated with the subset of transmission types at the common periodicity may be based on the adjusted data generation timing.

In some examples of the method, wireless devices, and non-transitory computer-readable medium described herein, adjusting the transmission time may include operations, features, means, or instructions for buffering data associated with the subset of transmission types prior to a transmission corresponding to the master transmission type, where transmitting the one or more transmissions at the common periodicity may be based on the buffering.

In some examples of the method, wireless devices, and non-transitory computer-readable medium described herein, the master transmission type corresponds to positional data associated with the wireless device.

A method by a user equipment (UE) is described. The method may include aligning a set of transmission periodicities associated with a set of transmission types to a common periodicity, buffing one or more transmissions of a set of multiple transmissions corresponding to the set of transmission types prior to performing packetization associated with at least one transmission of the set of multiple transmissions, and transmitting the set of multiple transmissions at the common periodicity via a single frame based on performing the packetization associated with the set of multiple transmissions.

A UE is described. The UE may include one or more memories storing processor executable code, and one or more processors coupled with the one or more memories. The one or more processors may individually or collectively be operable to execute the code to cause the UE to align a set of transmission periodicities associated with a set of transmission types to a common periodicity, buffer one or more transmissions of a set of multiple transmissions corresponding to the set of transmission types prior to performing packetization associated with at least one transmission of the set of multiple transmissions, and transmit the set of multiple transmissions at the common periodicity via a single frame based on performing the packetization associated with the set of multiple transmissions.

Another UE is described. The UE may include means for aligning a set of transmission periodicities associated with a set of transmission types to a common periodicity, means for buffing one or more transmissions of a set of multiple transmissions corresponding to the set of transmission types prior to performing packetization associated with at least one transmission of the set of multiple transmissions, and means for transmitting the set of multiple transmissions at the common periodicity via a single frame based on performing the packetization associated with the set of multiple transmissions.

A non-transitory computer-readable medium storing code is described. The code may include instructions executable by one or more processors to align a set of transmission periodicities associated with a set of transmission types to a common periodicity, buffer one or more transmissions of a set of multiple transmissions corresponding to the set of transmission types prior to performing packetization associated with at least one transmission of the set of multiple transmissions, and transmit the set of multiple transmissions at the common periodicity via a single frame based on performing the packetization associated with the set of multiple transmissions.

In some examples of the method, UEs, and non-transitory computer-readable medium described herein, transmitting the set of multiple transmissions at the common periodicity may include operations, features, means, or instructions for performing a socket write for each transmission of the set of multiple transmissions simultaneously.

In some examples of the method, UEs, and non-transitory computer-readable medium described herein, the packet size may be based on a threshold transmit unit size and the packet size does not exceed the threshold transmit unit size.

Some examples of the method, UEs, and non-transitory computer-readable medium described herein may further include operations, features, means, or instructions for processing associated with each transmission of the set of multiple transmissions may be assigned a dedicated central processing unit (CPU) core.

In some examples of the method, UEs, and non-transitory computer-readable medium described herein, the at least one transmission of the set of multiple transmissions corresponds to a transmission type associated with video data.

In some examples of the method, UEs, and non-transitory computer-readable medium described herein, the single frame may be a single Wi-Fi frame.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 shows an example of a transmission timeline that supports use case aware network traffic shaping techniques for power reduction.

FIGS. 13 and 14 show flowcharts illustrating methods that support use case aware network traffic shaping techniques for power reduction.

Like reference numbers and designations in the various drawings indicate like elements.

DETAILED DESCRIPTION

Figure 1:
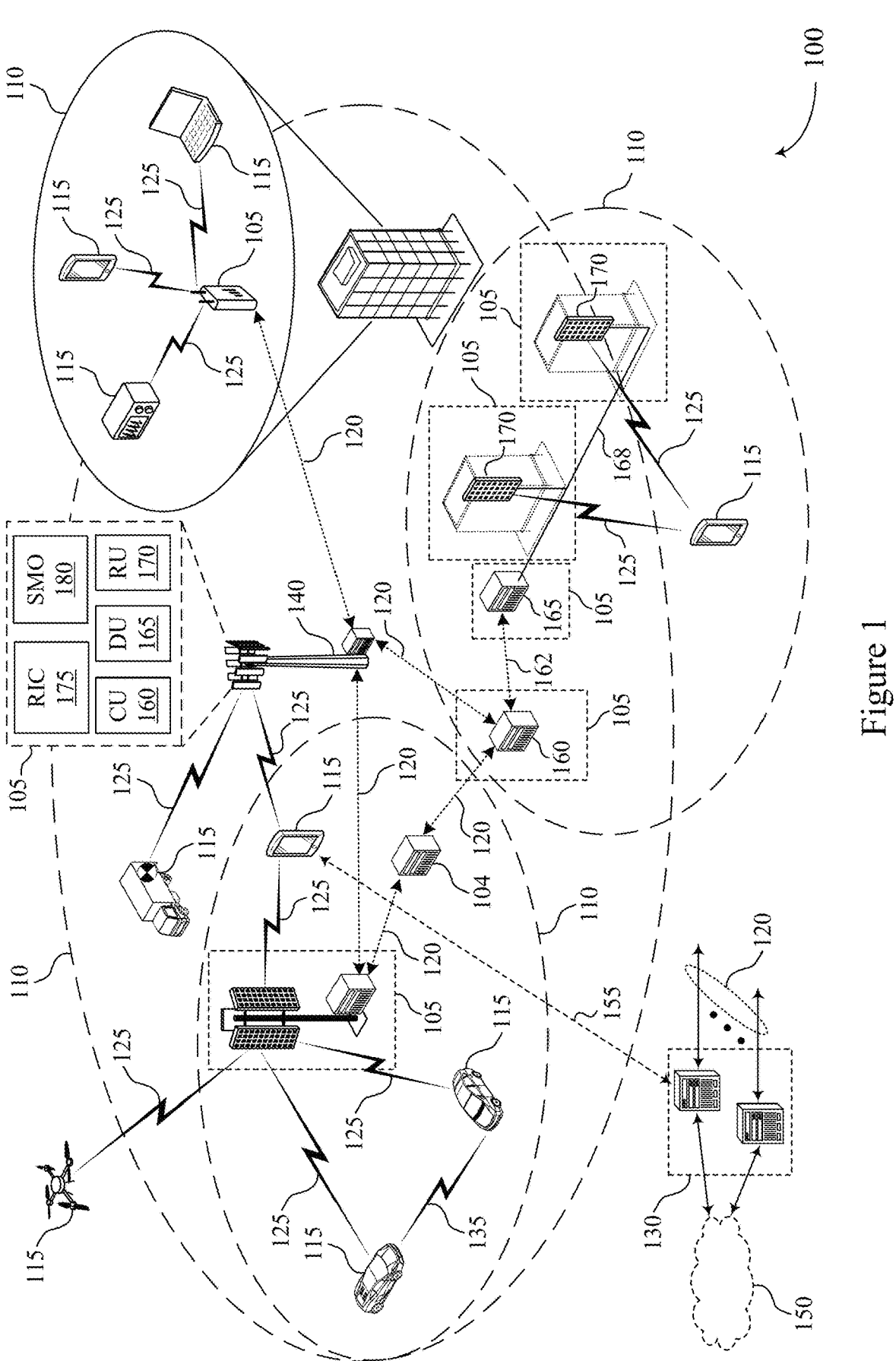
FIG. 1 shows an example of a wireless communications system that supports use case aware network traffic shaping techniques for power reduction.

The following description is directed to some implementations for the purposes of describing the innovative aspects of this disclosure. However, a person having ordinary skill in the art will readily recognize that the teachings herein can be applied in a multitude of different ways. The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing third generation (3G), fourth generation (4G), fifth generation (5G), or sixth generation (6G), or further implementations thereof, technology.

In some wireless communications systems, a user equipment (UE) may communicate with an augmented reality (AR) device (for example a pair of AR glasses). The UE may render video or audio frames to be displayed via the AR device. The AR device may communicate with the UE to offload processing and decrease power consumption at the AR device. For example, the AR device may transmit a set of uplink data streams corresponding to uplink transmission types (such as head pose data, statistics data, or tracking camera data, among other examples) to the UE. The UE may process the tracking data and transmit a set of downlink data streams corresponding to downlink transmission types (such as audio data or video data, among other examples) to the AR device based on the set of uplink data streams. For example, the UE may receive head pose data from the AR device. The UE may generate a video frame based on the head pose data. The UE may transmit the video frame to the AR device. Each data stream may be associated with a transmission periodicity (for example how often the data associated with the transmission type is transmitted or a transmission frequency). In some implementations, the AR device may transmit the set of uplink transmission types at different periodicities. In some implementations, the AR device may receive the set of downlink transmission types at different periodicities. Transmitting and receiving a set of transmission types associated with different transmission periodicities at the AR device may decrease the amount of time the AR device (such as a wireless communications component of the AR device) may enter a low power state. For example, multiple transmission types associated with unaligned transmission periodicities may increase power consumption at the AR device.

According to techniques described herein, in some implementations, the AR device may align a set of transmission periodicities associated with the set of uplink transmission types (for example uplink data streams) to a common transmission periodicity based on modifying one or more transmission periodicities associated with one or more uplink transmission types. Additionally, or alternatively, the AR device may modify a transmission time associated with an uplink transmission type to achieve phase alignment with (for example transmit at the same time as) a common transmission periodicity. The AR device may identify a threshold latency tolerance associated with each uplink transmission type. The common transmission periodicity may correspond to a master transmission type (such as an uplink data stream with a minimum threshold latency tolerance). The AR device may transmit data associated with the one or more uplink transmission types (such as uplink data streams) of the set uplink of transmission types at the common transmission periodicity. Additionally, or alternatively, the AR device may transmit data associated with an uplink data stream based on the data stream exceeding a respective latency tolerance.

In some implementations, the UE may align a set of transmission periodicities associated with a set of downlink transmission types (such as downlink data streams) to a common transmission periodicity. Data associated with a downlink transmission type may be based on a latency threshold corresponding to a threshold packet size. The threshold packet size may be limited to a maximum packet size that may be transmitted via a communication link between the AR device and the UE. The UE may buffer data associated with one or more of the downlink transmission types prior to performing packetization associated with a first downlink transmission type (for example video data). The UE may perform packetization associated with the first downlink transmission type. The UE may transmit data associated with the set of downlink data streams at the common transmission periodicity via a single frame based on performing packetization associated with the first transmission type. For example, the UE may packetize and hold data associated with the set of downlink transmission types until packetization has been performed on the first transmission type. The first transmission type may be a last video stream that is ready to be transmitted.

Particular implementations of the subject matter described in this disclosure can be implemented to realize one or more of the following potential advantages. The AR device may decrease power consumption based on the increased alignment of uplink transmission types or downlink transmission types. For example, the increased alignment may provide for an increased idle time at a wireless communications component at the AR device (such as a Wi-Fi chip). The wireless communications component at the AR device may enter a low power state more frequently based on the increased idle time. For example, the AR device may achieve a longer battery life or decreased battery constraints based on the increased alignment of uplink transmission types or downlink transmission types. Thus, techniques described herein may result in power consumption reduction, Wi-Fi chip power reduction, CPU power consumption reduction, thermal dissipation reduction, more efficient use of available Wi-Fi network bandwidth, efficient use of network traffic latency and improved user experience, among other examples.

FIG. 1 shows an example of a wireless communications system 100 that supports use case aware network traffic shaping techniques for power reduction. The wireless communications system 100 may include one or more network entities 105, one or more UEs 115, and a core network 130. In some implementations, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some implementations, network entities 105 and UEs 115 may wirelessly communicate via one or more communication links 125 (such as a radio frequency (RF) access link). For example, a network entity 105 may support a coverage area 110 (such as a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (such as any network entity described herein), a UE 115 (such as any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some implementations, network entities 105 may communicate with the core network 130, or with one another, or both. For example, network entities 105 may communicate with the core network 130 via one or more backhaul communication links 120 (such as in accordance with an S1, N2, N3, or other interface protocol). In some implementations, network entities 105 may communicate with one another via a backhaul communication link 120 (such as in accordance with an X2, Xn, or another interface protocol) either directly (such as directly between network entities 105) or indirectly (such as via a core network 130). In some implementations, network entities 105 may communicate with one another via a midhaul communication link 162 (such as in accordance with a midhaul interface protocol) or a fronthaul communication link 168 (such as in accordance with a fronthaul interface protocol), or any combination thereof. The backhaul communication links 120, midhaul communication links 162, or fronthaul communication links 168 may be or include one or more wired links (such as an electrical link, an optical fiber link), one or more wireless links (such as a radio link, a wireless optical link), among other examples or various combinations thereof. A UE 115 may communicate with the core network 130 via a communication link 155.

One or more of the network entities 105 described herein may include or may be referred to as a base station (BS) 140 (such as a base transceiver station, a radio BS, an NR BS, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some implementations, a network entity 105 (such as a BS 140) may be implemented in an aggregated (such as monolithic, standalone) BS architecture, which may be configured to utilize a protocol stack that is physically or logically integrated within a single network entity 105 (such as a single RAN node, such as a BS 140).

In some implementations, a network entity 105 may be implemented in a disaggregated architecture (such as a disaggregated BS architecture, a disaggregated RAN architecture), which may be configured to utilize a protocol stack that is physically or logically distributed among two or more network entities 105, such as an integrated access backhaul (IAB) network, an open RAN (O-RAN) (such as a network configuration sponsored by the O-RAN Alliance), or a virtualized RAN (vRAN) (such as a cloud RAN (C-RAN)). For example, a network entity 105 may include one or more of a central unit (CU) 160, a distributed unit (DU) 165, a radio unit (RU) 170, a RAN Intelligent Controller (RIC) 175 (such as a Near-Real Time RIC (Near-RT RIC), a Non-Real Time RIC (Non-RT RIC)), a Service Management and Orchestration (SMO) 180 system, or any combination thereof. An RU 170 also may be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (such as separate physical locations). In some implementations, one or more network entities 105 of a disaggregated RAN architecture may be implemented as virtual units (such as a virtual CU (VCU), a virtual DU (VDU), a virtual RU (VRU)).

The split of functionality between a CU 160, a DU 165, and an RU 170 is flexible and may support different functionalities depending on which functions (such as network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some implementations, the CU 160 may host upper protocol layer (such as layer 3 (L3), layer 2 (L2)) functionality and signaling (such as Radio Resource Control (RRC), service data adaptation protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (such as physical (PHY) layer) or L2 (such as radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (such as via one or more RUs 170). In some implementations, a functional split between a CU 160 and a DU 165, or between a DU 165 and an RU 170 may be within a protocol layer (such as some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (such as F1, F1-c, F1-u), and a DU 165 may be connected to one or more RUs 170 via a fronthaul communication link 168 (such as open fronthaul (FH) interface). In some implementations, a midhaul communication link 162 or a fronthaul communication link 168 may be implemented in accordance with an interface (such as a channel) between layers of a protocol stack supported by respective network entities 105 that are in communication via such communication links.

In wireless communications systems (such as wireless communications system 100), infrastructure and spectral resources for radio access may support wireless backhaul link capabilities to supplement wired backhaul connections, providing an IAB network architecture (such as to a core network 130). In some implementations, in an IAB network, one or more network entities 105 (such as IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (such as a donor BS 140). The one or more donor network entities 105 (such as IAB donors) may be in communication with one or more additional network entities 105 (such as IAB nodes 104) via supported access and backhaul links (such as backhaul communication links 120). IAB nodes 104 may include an IAB mobile termination (IAB-MT) controlled (such as scheduled) by DUs 165 of a coupled IAB donor. An IAB-MT may include an independent set of antennas for relay of communications with UEs 115, or may share the same antennas (such as of an RU 170) of an IAB node 104 used for access via the DU 165 of the IAB node 104 (such as referred to as virtual IAB-MT (vIAB-MT)). In some implementations, the IAB nodes 104 may include DUs 165 that support communication links with additional entities (such as IAB nodes 104, UEs 115) within the relay chain or configuration of the access network (such as downstream). In such implementations, one or more components of the disaggregated RAN architecture (such as one or more IAB nodes 104 or components of IAB nodes 104) may be configured to operate according to the techniques described herein.

In the implementation of the techniques described herein applied in the context of a disaggregated RAN architecture, one or more components of the disaggregated RAN architecture may be configured to support use case aware network traffic shaping techniques for power reduction as described herein. For example, some operations described as being performed by a UE 115 or a network entity 105 (such as a BS 140) may additionally, or alternatively, be performed by one or more components of the disaggregated RAN architecture (such as IAB nodes 104, DUs 165, CUs 160, RUS 170, RIC 175, SMO 180).

A UE 115 may include or may be referred to as a mobile device, a wireless device, a remote device, a handheld device, or a subscriber device, or some other suitable terminology, where the "device" also may be referred to as a unit, a station, a terminal, or a client, among other examples. A UE 115 also may include or may be referred to as a personal electronic device such as a cellular phone, a personal digital assistant (PDA), a tablet computer, a laptop computer, or a personal computer. In some implementations, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay BSs, among other examples, as shown in FIG. 1.

The UEs 115 and the network entities 105 may wirelessly communicate with one another via one or more communication links 125 (such as an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (such as a bandwidth part (BWP)) that is operated according to one or more physical layer channels for a given radio access technology (such as LTE, LTE-A, LTE-A Pro, NR). Each physical layer channel may carry acquisition signaling (such as synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (such as entity, sub-entity) of a network entity 105. For example, the terms "transmitting," "receiving," or "communicating," when referring to a network entity 105, may refer to any portion of a network entity 105 (such as a BS 140, a CU 160, a DU 165, a RU 170) of a RAN communicating with another device (such as directly or via one or more other network entities 105).

Signal waveforms transmitted via a carrier may be made up of multiple subcarriers (such as using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (such as a duration of one modulation symbol) and one subcarrier, for which the symbol period and subcarrier spacing may be inversely related. The quantity of bits carried by each resource element may depend on the modulation scheme (such as the order of the modulation scheme, the coding rate of the modulation scheme, or both), such that a relatively higher quantity of resource elements (such as in a transmission duration) and a relatively higher order of a modulation scheme may correspond to a relatively higher rate of communication. A wireless communications resource may refer to a combination of an RF spectrum resource, a time resource, and a spatial resource (such as a spatial layer, a beam), and the use of multiple spatial resources may increase the data rate or data integrity for communications with a UE 115.

The time intervals for the network entities 105 or the UEs 115 may be expressed in multiples of a basic time unit which may, in some implementations, refer to a sampling period of $T_s = 1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (such as 10 milliseconds (ms)). Each radio frame may be identified by a system frame number (SFN) (such as ranging from 0 to 1023).

Each frame may include multiple consecutively numbered subframes or slots, and each subframe or slot may have the same duration. In some implementations, a frame may be divided (such as in the time domain) into subframes, and each subframe may be further divided into a quantity of slots. Alternatively, each frame may include a variable quantity of slots, and the quantity of slots may depend on subcarrier spacing. Each slot may include a quantity of symbol periods (such as depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (such as $N_f$) sampling periods. The duration of a symbol period may depend on the subcarrier spacing or frequency band of operation.

A subframe, a slot, a mini-slot, or a symbol may be the smallest scheduling unit (such as in the time domain) of the wireless communications system 100 and may be referred to as a transmission time interval (TTI). In some implementations, the TTI duration (such as a quantity of symbol periods in a TTI) may be variable. Additionally, or alternatively, the smallest scheduling unit of the wireless communications system 100 may be dynamically selected (such as in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (such as a control resource set (CORESET)) for a physical control channel may be defined by a set of symbol periods and may extend across the system bandwidth or a subset of the system bandwidth of the carrier. One or more control regions (such as CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (such as control channel elements (CCEs)) associated with encoded information for a control information format having a given payload size. Search space sets may include common search space sets configured for sending control information to multiple UEs 115 and UE-specific search space sets for sending control information to a specific UE 115.

In some implementations, a network entity 105 (such as a BS 140, an RU 170) may be movable and therefore provide communication coverage for a moving coverage area 110. In some implementations, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (such as BSs 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (such as a mode that supports one-way communication via transmission or reception, but not transmission and reception concurrently). In some implementations, half-duplex communications may be performed at a reduced peak rate. Other power conservation techniques for the UEs 115 include entering a power saving deep sleep mode when not engaging in active communications, operating using a limited bandwidth (such as according to narrowband communications), or a combination of these techniques. For example, some UEs 115 may be configured for operation using a narrowband protocol type that is associated with a defined portion or range (such as set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some implementations, a UE 115 may be configured to support communicating directly with other UEs 115 via a device-to-device (D2D) communication link 135 (such as in accordance with a peer-to-peer (P2P), D2D, or sidelink protocol). In some implementations, one or more UEs 115 of a group that are performing D2D communications may be within the coverage area 110 of a network entity 105 (such as a BS 140, an RU 170), which may support aspects of such D2D communications being configured by (such as scheduled by) the network entity 105. In some implementations, one or more UEs 115 of such a group may be outside the coverage area 110 of a network entity 105 or may be otherwise unable to or not configured to receive transmissions from a network entity 105. In some implementations, groups of the UEs 115 communicating via D2D communications may support a one-to-many (1: M) system in which each UE 115 transmits to each of the other UEs 115 in the group. In some implementations, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (such as a mobility management entity (MME), an access and mobility management function (AMF)) and at least one user plane entity that routes packets or interconnects to external networks (such as a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (such as BSs 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communication using UHF waves may be associated with smaller antennas and shorter ranges (such as less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some implementations, operations using unlicensed bands may be based on a carrier aggregation configuration in conjunction with component carriers operating using a licensed band (such as LAA). Operations using unlicensed spectrum may include downlink transmissions, uplink transmissions, P2P transmissions, or D2D transmissions, among other examples.

A network entity 105 (such as a BS 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more BS antennas or antenna arrays may be co-located at an antenna assembly, such as an antenna tower. In some implementations, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (such as the same codeword) or different data streams (such as different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which also may be referred to as spatial filtering, directional transmission, or directional reception, is a signal processing technique that may be used at a transmitting device or a receiving device (such as a network entity 105, a UE 115) to shape or steer an antenna beam (such as a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (such as with respect to the antenna array of the transmitting device or receiving device, or with respect to some other orientation).

According to techniques described herein, in some implementations, an AR device may align a set of transmission periodicities associated with a set of uplink transmission types (such as uplink data streams) to a common transmission periodicity based on modifying one or more transmission periodicities associated with one or more uplink transmission types. Additionally, or alternatively, the AR device may modify a transmission time associated with an uplink transmission type to achieve phase alignment with (such as transmit at the same time as) a common transmission periodicity. The AR device may identify a threshold latency tolerance associated with each uplink transmission type. The common transmission periodicity may correspond to a master transmission type (such as an uplink data stream with a minimum threshold latency tolerance). The AR device may transmit data associated with the one or more uplink transmission types (such as uplink data streams) of the set uplink of transmission types at the common transmission periodicity. Additionally, or alternatively, the AR device may transmit data associated with an uplink data stream based on the data stream exceed a respective latency tolerance.

In some implementations, the UE 115 may align a set of transmission periodicities associated with a set of downlink transmission types (such as downlink data streams) to a common transmission periodicity. A packet size associated with a downlink transmission type may be based on a latency threshold associated with the downlink transmission type. The UE 115 may buffer data associated with one or more of the downlink transmission types prior to performing packetization associated with a first downlink transmission type (such as video data). The UE 115 may transmit data associated with the set of downlink data streams at the common transmission periodicity via a single frame based on performing packetization associated with the first transmission type.

Figure 2:
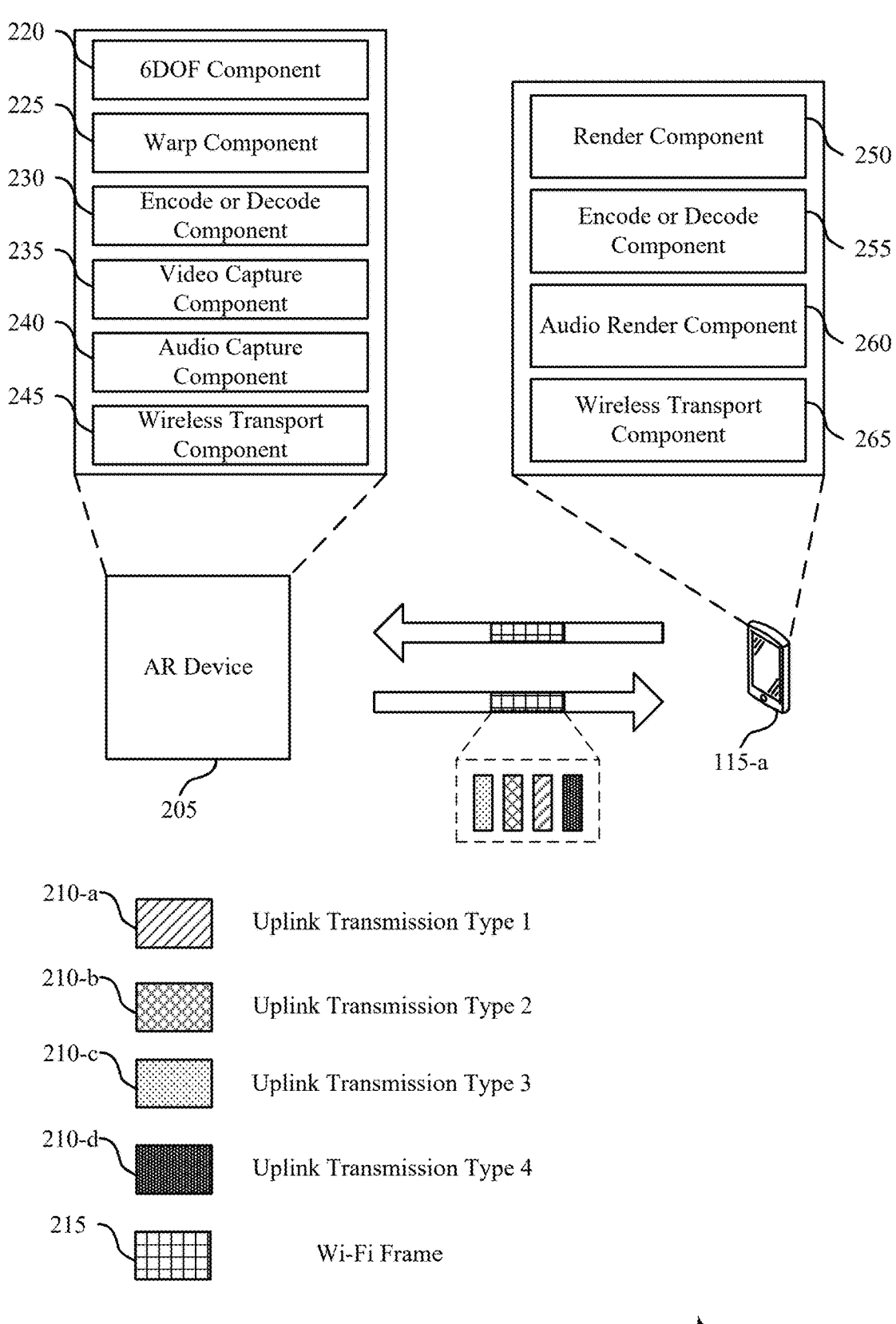
FIG. 2 shows an example of a signaling diagram that supports use case aware network traffic shaping techniques for power reduction.

FIG. 2 shows an example of a signaling diagram 200 that supports use case aware network traffic shaping techniques for power reduction. In some implementations, signaling diagram 200 may implement aspects of wireless communications system 100. For example, a UE 115-*a* may represent an example of a UE, such as the UEs 115 described with reference to FIG. 1. Although the UE 115-*a* may be described herein as an example of a UE 115, it should be understood that UE 115-*a* may be an example of a different wireless device, such as a host, server, host sever, remote host, or computation server. The AR device 205 may represent an example of a UE, such as the UE 115 described with reference to FIG. 1, an XR device, AR glasses head mount device (HMD), or another wireless device. The AR device 205 and the UE 115-*a* may communicate via one or more communication links, including a downlink communication link and an uplink communication link. The downlink communication link may include communication from the UE 115-*a* to the AR device 205. The uplink communication link may include communication from the AR device 205 to the UE 115-*a*. In some examples, the signaling diagram 200 may be an example of a peer-to-peer network including the UE 115-*a* and the AR device 205. The UE 115-*a* may include a render component 250, a encode or decode component 255, an audio render component 260, and a wireless transport component 265. The AR device 205 may include a six degrees of freedom (6DOF) component 220, a warp component 225, a encode or decode component 230, a video capture component 235, an audio capture component 240, and a wireless transport component 245. As described herein, the UE 115-*a* or the AR device 205 may align a set of transmission periodicities to a common transmission periodicity. The transmission periodicities may be examples of transmission frequencies, transfer rates, data rates, or a stream cadence.

In some wireless communications systems, the AR device 205 (e.g., a wireless device) may offload major processing components to the UE 115-*a* (such as a host phone or server) based on spatial constraints or power consumption. For example, the AR device 205 may offload major processing components to the UE 115-*a* based on a sleek form factor or to provide all-day use of the AR device 205. The AR device 205 may include multiple power contributors (such as a central processing unit (CPU) chip and a Wi-Fi chip). In some implementations, the power consumption of the Wi-Fi chip at the AR device 205 may be comparable to the power consumption of the CPU chip at the AR device 205. For example, the CPU chip may be associated with a power consumption of 830 Milliwatts (mW) and the Wi-Fi chip may be associated with a power consumption of 602 mW. The power consumption of the Wi-Fi chip may be based on the active duration (such as utilized duration) associated with the Wi-Fi chip. For example, if the Wi-Fi chip has a low active duration, the power consumption of the Wi-Fi chip at the AR device 205 may be reduced, reducing the total power consumption of the AR device 205.

Communications between the AR device 205 and the UE 115-a (such as the AR pipeline) may be associated with multiple transmission types. Transmission types may be examples of streams, data streams, transmission steams, uplink data streams, downlink data streams, or data traffic. In some implementations, reducing the Wi-Fi chip power consumption may increase battery life associated with the AR device 205. For example, the Wi-Fi links (such as the uplink communication link and the downlink communication link) may be utilized for as small a duration as possible, resulting in decreased power consumption and increased battery life. However, the AR pipeline may perform transmitting and receiving of data at different times and at different transmission periodicities to maintain user experience. For example, uplink traffic may include multiple uplink transmission types 210 associated with different periodicities. For example, an uplink transmission type 210-a, an uplink transmission type 210-b, an uplink transmission type 210-c, or an uplink transmission type 210-d may be associated with unaligned uplink periodicities. Additionally, or alternatively, downlink traffic may include multiple downlink transmission types associated with different periodicities (such as unaligned downlink periodicities). The unaligned uplink periodicities and the unaligned downlink periodicities may increase the active duration of the Wi-Fi chip at the AR device 205, increasing the power consumption at the AR device 205.

Based on the spatial limitations of the AR device 205, placement of hardware components, reducing power consumption, and heat dissipation may be limited. The AR device 205 may utilize a higher processing capability at the UE 115-a to decrease power consumption and processing at the AR device 205. For example, a large amount of processing may be offloaded to the UE 115-a connected via a wired connection (such as universal serial bus (USB)) or wireless communication (such as Wi-Fi). A split rendering system may be implemented between the UE 115-a and the AR device 205. The high processing tasks such as frame rendering may be offloaded to the UE 115-a, where the UE 115-a may encode and transmit the rendered frame to the AR device 205. The AR device 205 may decode, warp, and display the rendered frame.

For example, the 6DOF component 220 at the AR device 205 may generate a 6DOF pose (such as position or rotation data associated with the AR device 205). The wireless transport component 245 at the AR device 205 may transmit the 6DOF pose data to the UE 115-a via a wireless link (such as an uplink or Wi-Fi link). The render component 250 at the UE 115-a may render content or generate a rendered frame based on the received 6DOF pose data. The encode or decode component 255 at the UE 115-a may encode and packetize the rendered content for transmission. The wireless transport component 265 at the UE 115-a may transmit the encoded stream or encoded rendered content to the AR device 205 over the wireless link (such as Wi-Fi). The encode or decode component 230 and the warp component 225 at the AR device 205 may perform video decode and time warp based on the 6DOF data. The AR device 205 may display the reprojected content to a user. Additionally, or alternatively, the video capture component 235 and audio capture component 240 at the AR device 205 may generate an audio input and a camera stream. The AR device 205 may transmit the audio input and the camera stream to the UE 115-a. For example, the encode or decode component 230 and the wireless transport component 245 at the AR device 205 may encode, packetize, and transmit a camera frame (such as a camera frame of the camera stream) to the UE 115-a. The encode or decode component 255 at the UE 115-a may de-packetize, decode and submit the camera frame to an application layer. The application layer at the UE 115-a may generate a rendered frame based on the camera frame or audio data.

In some implementations, multiple uplink transmission types may be transmitted from the AR device 205 to the UE 115-a at different periodicities. For example, a first uplink transmission type 210-a may be associated with a highest periodicity of the set of uplink transmission types 210. For example, the first uplink transmission type 210-a may be head pose data (such as 6DOF data). Head pose data may be transmitted from the AR device 205 to the UE 115-a at a high transmission periodicity (such as rate or 500 Hz) to ensure minimal latency and user experience impact. For example, the first uplink transmission type 210-a may be associated with a highest periodicity based on a latency tolerance associated with the first uplink transmission type 210-a. Other uplink transmission types 210 may be associated with different transmission periodicities that may be unaligned with the first uplink transmission type 210-a.

In some implementations, multiple downlink transmission types may be transmitted from the UE 115-a to the AR device 205 at different transmission periodicities. For example, a first downlink transmission type may be audio data. For example, audio data may be generated from the UE 115-a and may be transmitted to the AR device 205 at a transmission periodicity (such as rate or 100 Hz) different than the transmission periodicity associated with the first uplink transmission type or video data. For example, the transmission periodicity associated with audio data may be agnostic to a transmission periodicity associated with video data. In some examples, a second downlink transmission type and a third downlink transmission type may be data streams for a left eye and right eye of a user respectively. Individual video data streams for a left eye and right eye of a user may be generated at the UE 115-a based on the rendering frame rate. The UE 115-a may transfer the video data streams to the AR device 205. The quantity of data packets associated with the video data streams may vary based on the size of the video or depth frame.

The uplink and downlink transmission types may have independent periodicities. The Wi-Fi chip at the AR device 205 may be actively transmitting or receiving data with very minimal window (or no window) to move to a low power state based on the different transmission periodicities associated with the uplink and downlink transmission types. The AR device 205 may increase power consumption based on the independent transmission periodicities to preserve a seamless user experience.

According to techniques described herein, the AR device 205 or the UE 115-a may optimize and shape network traffic for transmission and reception of various latency sensitive XR data (such as transmission types) over a wireless link between the AR device 205 and the UE 115-a to achieve power reduction for the wireless system. Some techniques described herein may reduce power consumption at the AR device 205 or the UE 115-a. For example, the AR device 205 may consolidate or align multiple uplink transmission types 210 into a single Wi-Fi frame 215, and the UE 115-a may consolidate or align multiple downlink transmission types into a single Wi-Fi frame 215, and this consolidation may save power associated with transmission of Wi-Fi frames 215.

In some implementations, the AR device 205 may align a set of transmission periodicities associated with a set of uplink transmission types 210 to a common transmission periodicity based on modifying one or more transmission periodicities associated with one or more uplink transmission types. Additionally, or alternatively, the AR device 205 may modify an uplink transmission time associated with a transmission type to achieve phase alignment with a common transmission periodicity. For example, the AR device 205 may modify an uplink transmission time to transmit at the same time as a common transmission periodicity. The AR device may identify a threshold latency tolerance associated with each uplink transmission type 210. The common transmission periodicity may correspond to a master transmission type (such as an uplink transmission type associated with a minimum threshold latency tolerance). The AR device may transmit data associated with the one or more uplink transmission types 210 of the set uplink of transmission types 210 at the common transmission periodicity. Additionally, or alternatively, the AR device 205 may transmit data associated with an uplink data stream based on the data stream exceed a respective latency tolerance. For example, the AR device 205 may consolidate or align multiple uplink transmission types 210 into a single Wi-Fi frame 215.

In some implementations, the UE 115-*a* may align a set of transmission periodicities associated with a set of downlink transmission types to a common transmission periodicity. A packet size associated with a downlink transmission type may be based on a latency threshold associated with the downlink transmission type. The UE 115-*a* may buffer data associated with one or more of the downlink transmission types prior to performing packetization associated with a first downlink transmission type (such as video data). The UE 115-*a* may transmit data associated with the set of downlink data streams at the common transmission periodicity via a single frame (such as a single Wi-Fi frame 215) based on performing packetization associated with the first transmission type. For example, the UE may packetize and hold data associated with the set of downlink transmission types until packetization has been performed on the first transmission type. The first transmission type may be a last video stream that is ready to be transmitted. The UE 115-*a* may consolidate or align multiple downlink transmission types into a single Wi-Fi frame 215.

In some cases, the AR device 205 and the UE 115-*a* may be associated with an increased maximum transmit (MTU) size. For example, the AR device 205 and the UE 115-*a* may support an MTU size of 64 kilobytes for a user datagram protocol (UDP).

The AR device 205 or the UE 115-*a* may process the set of uplink transmission types 210 or the set of downlink transmission types via one or more threads associated with a respective transmission type. For example, the uplink transmission type 210-*a* may be associated with a first thread of the AR device 205, and the uplink transmission type 210-*b* may be associated with a second thread of the AR device 205. Each thread of the one or more threads may be associated with a dedicated CPU core. For example, the first thread associated with the uplink transmission type 210-*a* may be associated with a first dedicated CPU core, and the second thread associated with the uplink transmission type 210-*b* may be associated with a second dedicated CPU core.

The dedicated CPU cores may ensure that the one or more threads are scheduled simultaneously and reach a Wi-Fi layer at a common time.

In some examples, each thread of the one or more threads may be associated with a dedicated CPU core based on an availability associated with the dedicated CPU cores. For example, the first thread and the second thread may be associated with the first dedicated CPU core based on an availability of one or more CPU cores at the UE 115-*a* or the AR device 205.

In some examples, a type of service (ToS) value associated with the uplink transmission types 210 or the downlink transmission types may be configured uniformly at the AR device 205 or the UE 115-*a*. For example, the uplink transmission type 210-*a*, the uplink transmission type 210-*b*, or one or more downlink transmission types may be configured with a same ToS value. The Wi-Fi layer (such as a Wi-Fi layer at the AR device 205 or a Wi-Fi layer at the UE 115-*a*) may aggregate the one or more uplink transmission types 210 or the one or more downlink transmission types based on the uniform ToS value. For example, the Wi-Fi layer may aggregate and transmit one or more transmission types and transmit the one or more transmission types as a single Wi-Fi frame based on the uniform ToS value.

The aggregated transmission types (such as aggregated uplink transmission types 210 or downlink transmission types) may increase Wi-Fi idle time and enable the AR device 205 to operate in a lower power state. For example, Wi-Fi idle time may be increased based on the aggregated transmission types being transmitted in a single Wi-Fi frame. The increased Wi-Fi idle time may decrease power consumption at the AR device 205.

Figure 3:
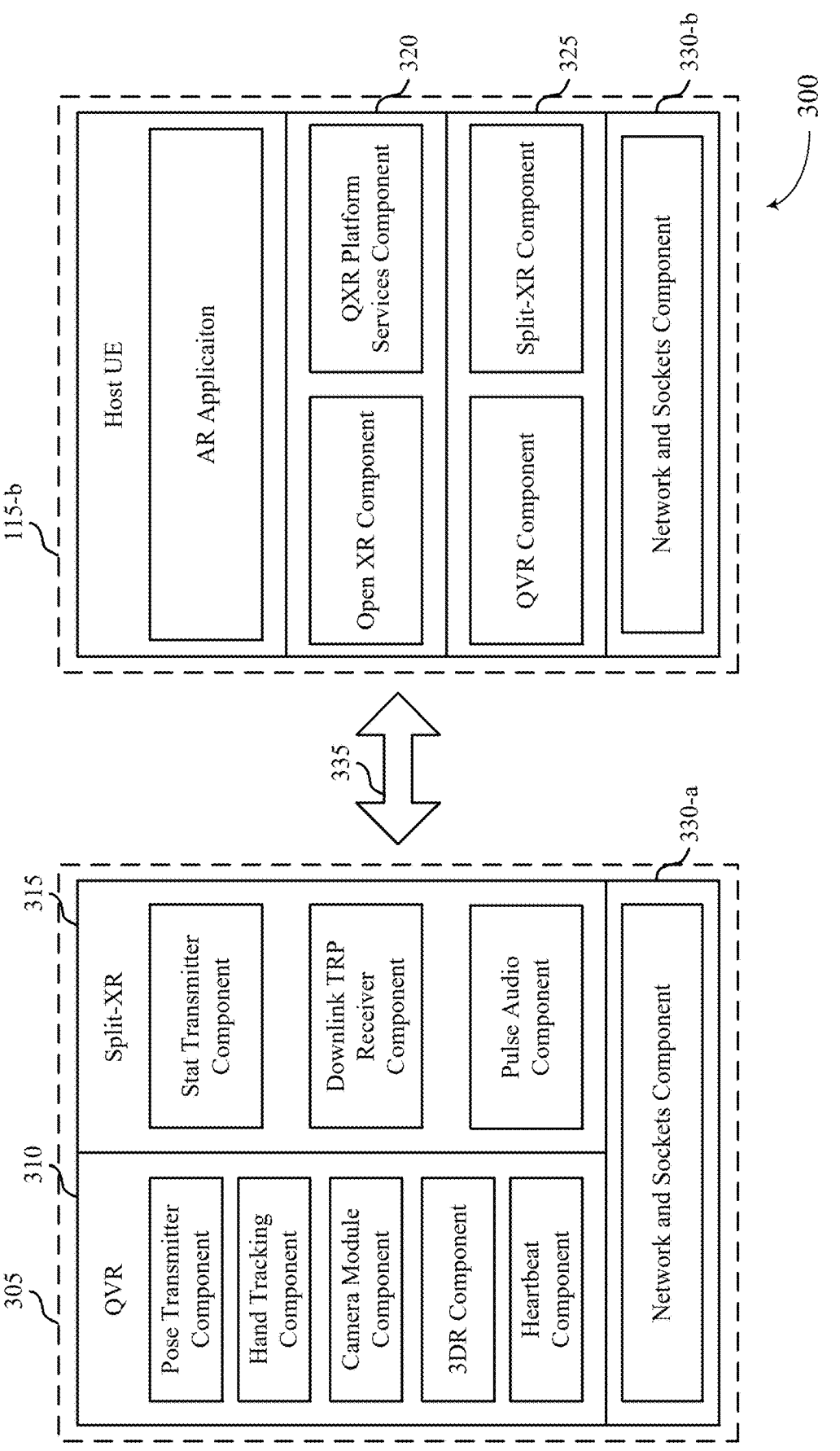
FIG. 3 shows an example of a signaling diagram that supports use case aware network traffic shaping techniques for power reduction.

FIG. 3 shows an example of a signaling diagram 300 that supports use case aware network traffic shaping techniques for power reduction. In some implementations, signaling diagram 300 may implement aspects of wireless communications system 100 and signaling diagram 200. For example, a UE 115-*b* may be an example of one or more aspects of a UE 115 as described herein, including with reference to FIGS. 1 and 2. The AR device 305 may be an example of one or more aspects of an AR device (such as AR device 205) as described herein, including with reference to FIGS. 1 and 2. The UE 115-*b* may include one or more software layers. For example, the UE 115-*b* may include an AR application, a layer one 320 including an open XR component and a QXR platform services component, a layer zero 325 including a QVR component, and a split XR component, and a network and sockets component 330-*b*. The AR device 305 may include QVR components 310, such as a pose transmitter component, a hand tracking component, a camera module component, a three-dimensional rendering (3DR) component, and a heartbeat component. The AR device 305 may include split XR components 315 such as a stat transmitter component, a downlink real time transport protocol (RTP) receiver component, and a pulse audio component. The AR device 305 may include a network and sockets component 330-*a*.

Communications between the AR device 305 (e.g., a wireless device) and the UE 115-*b* (such as communication via an AR connection) may be associated with multiple transmission types associated with different transmission periodicities. The AR device 305 may transmit data associated with a set of uplink transmission types to the UE 115-*b*. For example, the AR device 305 may transmit the uplink transmission types 210 as described with reference to FIG. 2. The uplink transmission types may include data generated by a pose transmitter component. For example, an uplink transmission type may include 6DOF data associated with the AR device 305. The uplink transmission types may include data generated by a stat transmitter component (such as statistics data). The uplink transmission types may include data generated by a hand tracking component. For example, an uplink transmission type may include data associated with the spatial position of the hands of a user. The uplink transmission types may include data generated by a camera module component. For example, an uplink transmission type may include red-green-blue (RGB) camera data or tracking camera data. The uplink transmission types may include data generated by a 3DR component. For example, an uplink transmission type may include 3D rendering data. The uplink transmission types may include data generated by a heartbeat component. For example, an uplink transmission type may include one or more synchronization or connectivity check signals.

Each uplink transmission type may be associated with a transmission periodicity. For example, a first uplink transmission type associated with data generated by a pose transmitter component may be associated with a first transmission periodicity (such as 500 Hz). In some implementations, a second uplink transmission type associated with data generated by a stat transmitter component may be associated with a second transmission periodicity (such as 45 Hz). In some implementations, a third uplink transmission type associated with a first set of data generated by a camera module component (such as data associated with a tracking camera) may be associated with a third transmission periodicity (such as 45 Hz). In some implementations, a fourth uplink transmission type associated with a second set of data generated by the camera module component (such as data associated with a RGB camera) may be associated with a fourth transmission periodicity (such as 30 Hz). In some implementations, a fifth uplink transmission type associated with data generated by a hand tracking component may be associated with a fifth transmission periodicity (such as 45 Hz). In some implementations, a sixth uplink transmission type associated with data generated by a heartbeat component may be associated with a sixth transmission periodicity (such as 2.5 Hz). In some implementations, a seventh uplink transmission type associated with data generated by a 3DR component may be associated with a seventh transmission periodicity (such as 45 Hz).

Data handshakes in an XR system may be done between different software layers and modules (such as different components) at the UE 115-*b* and the AR device 305. The data handshakes may be done at the OS level. For example, the AR device 305 may transmit data associated with the uplink transmission types to the UE 115-*b* via the wireless link 335. In some implementations, the AR device 305 may periodically transmit data associated with the first uplink transmission type at the first periodicity associated with the first transmission type. For example, the AR device 305 may transmit data associated with data generated by a pose transmitter component at a periodicity of 500 Hz. In some implementations, the AR device 305 may periodically transmit data associated with the second uplink transmission type at the second periodicity associated with the second transmission type. For example, the AR device may transmit data generated by a stat transmitter component at a periodicity of 45 Hz. The AR device 305 may transmit the data via the network and sockets component 330-*a*, and the UE 115-*b* may receive the data via the network and sockets component 330-*b*.

The UE 115-*b* may process the uplink transmission types via one or more software layers (such as the layer zero 325, the layer one 320, or the AR application). For example, the layer zero 325 may process at least some of the uplink transmission types via the QVR component. The UE 115-*b* may process the seventh uplink transmission type via the QXR platform services component. For example, the UE 115-*b* may process data generated by the 3DR component via the QXR platform. Additionally, or alternatively, the AR application or other software layers or components may process the set of uplink transmission types.

The AR application at the UE 115-*b* may render a frame. The AR application may render data associated with downlink transmission types. The UE 115-*b* may generate data associated with the downlink transmission types via the split XR component in the layer zero 325. The UE 115-*b* may transmit data associated with the downlink transmission types to the AR device 305 via the wireless link 335. In some implementations, the UE 115-*b* may transmit the data via the network and sockets component 330-*b*, and the AR device 305 may receive the data via the network and sockets component 330-*a*.

Each uplink transmission type may be associated with a transmission periodicity. For example, a first downlink transmission type associated with audio data may be associated with a first transmission periodicity (such as 100 Hz). In some implementations, a second downlink transmission type associated with left video data (such as video data displayed to a left screen of the AR device) may be associated with a second transmission periodicity (such as 45 frames per second (FPS)). In some implementations, a third downlink transmission type associated with a right video data (such as video data displayed to a right screen of the AR device 305) may be associated with a third transmission periodicity (such as 45 FPS). In some implementations, a fourth downlink transmission type associated with left depth data (such as depth data associated with the left video data) may be associated with a fourth transmission periodicity (such as 45 FPS). In some implementations, a fifth downlink transmission type associated with right depth data (such as depth data associated with right video data) may be associated with a fifth transmission periodicity (such as 45 FPS).

The AR device 305 may process at least some of the downlink transmission types via a downlink real time transport protocol (RTP) receiver component. The AR device 305 may process the first downlink transmission type via the pulse audio component. For example, the AR device 305 may process audio data via the pulse audio component. The AR device 305 may display the frame rendered by the AR application at the UE 115-*b* to the user based on processing the downlink transmission types.

According to techniques described herein, in some implementations, the AR device 305 may align a set of transmission periodicities associated with the set of uplink transmission types to a common transmission periodicity based on modifying one or more transmission periodicities associated with one or more uplink transmission types. For example, the AR device 305 may modify the transmission periodicity associated with the first transmission type from 500 Hz to 45 Hz. The AR device 305 may compensate for the increased latency associated with the decrease in transmission periodicity by utilizing deep learning prediction models. Additionally, or alternatively, the AR device 305 may modify a transmission time associated with an uplink transmission type to achieve phase alignment with a common transmission periodicity. The AR device may transmit the uplink transmission type at the same time via a single Wi-Fi frame. For example, the AR device 305 may modify a transmission time associated with the third uplink transmission type to achieve phase alignment between the third uplink transmission type and a common transmission periodicity. The AR device 305 may identify a threshold latency tolerance associated with each uplink transmission type. In some implementations, the common transmission periodicity may correspond to a master transmission type. The master transmission type may be an uplink data stream with a minimum threshold latency tolerance. For example, the common transmission periodicity may correspond to the transmission periodicity associated with the first transmission type after the modification to the transmission periodicity. The AR device 305 may transmit data associated with the one or more uplink transmission types of the set uplink of transmission types at the common transmission periodicity. Additionally, or alternatively, the AR device 205 may transmit data associated with an uplink transmission types based on data associated with the transmission type exceeding a respective latency tolerance.

In some implementations, the UE 115-a may align a set of transmission periodicities associated with a set of downlink transmission types (such as a set of downlink data streams) to a common transmission periodicity. A packet size (such as a MTU size) associated with a downlink transmission type may be based on a data size associated with one or more of the downlink transmission types. For example, the MTU size may be based on a data size associated with audio data and video data. The MTU size may be determined to include the audio data and the video data in a single packet (such as a Wi-Fi frame). The UE 115-a may buffer data associated with one or more of the downlink transmission types prior to performing packetization associated with the fourth downlink transmission type. For example, the UE 115-a may buffer the first downlink transmission type, the second downlink transmission type, the third downlink transmission types, and the fifth downlink transmission type prior to performing packetization associated with video data. The UE 115-a may transmit data associated with the set of downlink data streams at the common transmission periodicity via a single frame (such as a single Wi-Fi frame) based on performing packetization associated with the fourth transmission type.

Figure 4:
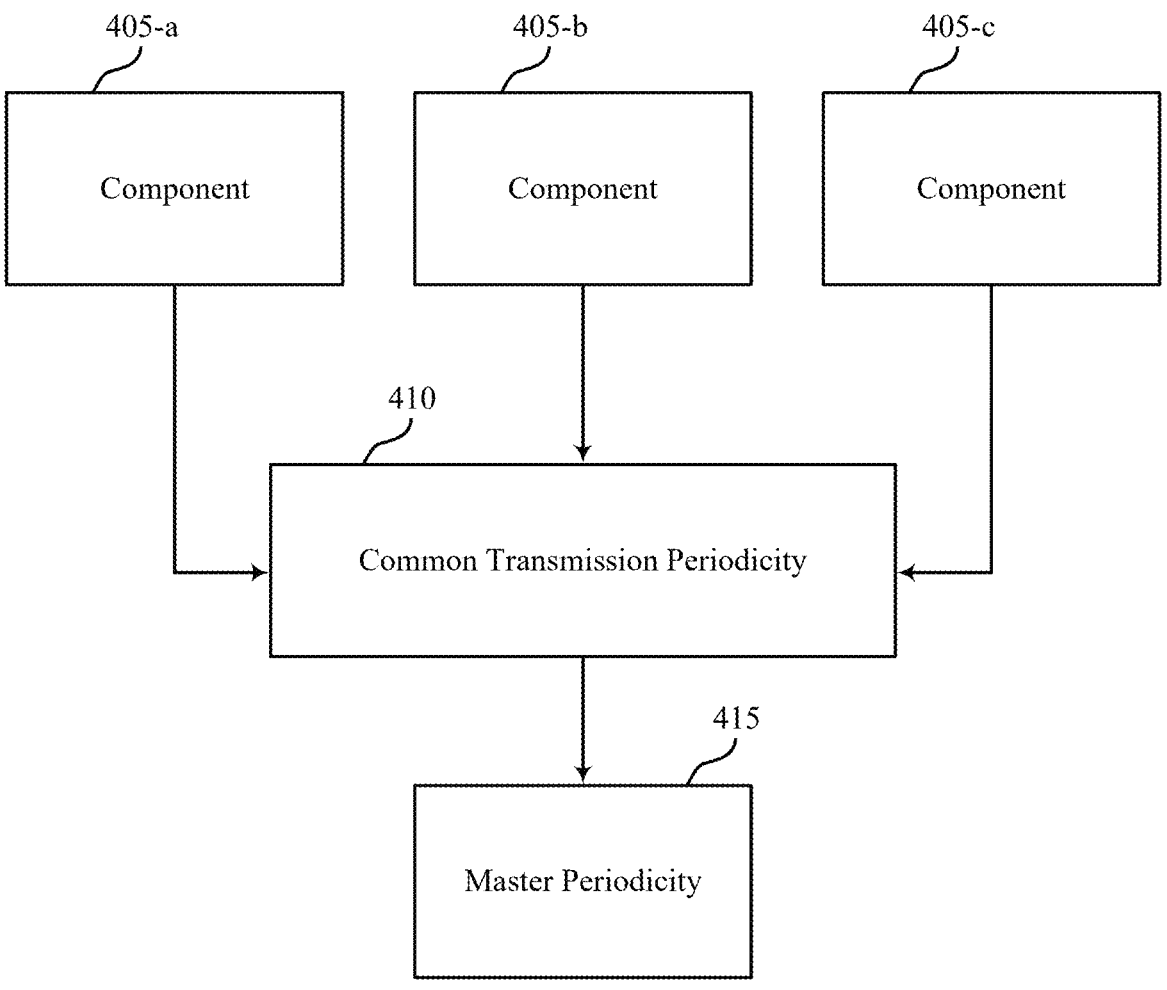
FIG. 4 shows an example of a periodicity configuration that supports use case aware network traffic shaping techniques for power reduction.

FIG. 4 shows an example of a periodicity configuration 400 that supports use case aware network traffic shaping techniques for power reduction. In some implementations, periodicity configuration 400 may implement aspects of, or be implemented by aspects of, the wireless communication system 100, the signaling diagram 200, or the signaling diagram 300. For example, a UE 115 or a AR device may implement the periodicity configuration 400. The UE 115 may be an example of one or more aspects of a UE 115 as described herein, including with reference to FIGS. 1-3. The AR device may be an example of one or more aspects of an AR device (such as the AR device 205 or the AR device 305) as described herein, including with reference to FIGS. 1-3.

The AR device (e.g., a wireless device) may perform traffic scheduling based on the periodicity configuration 400 to reduce power consumption. For example, the periodicity configuration 400 may reduce power consumption associated with a Wi-Fi chip at the AR device. For example, the AR device may aggregate data transmissions into a single Wi-Fi frame. The traffic scheduling allows the Wi-Fi chip to move to a lower power mode during idle time (such as during time with no scheduled uplink or downlink traffic). The AR device may identify a common transmission periodicity 410 from a set of transmitting modules (such as uplink data generation components 405 described with reference to FIG. 4). The AR device may align transmission periodicities for each uplink transmission type to the common transmission periodicity 410.

The AR device may determine an acceptable wait time for non-latency sensitive traffic. For example, the AR device may classify streams based on latency sensitivity. The AR device may configure the most latency sensitive transmission type as a master transmission type and the remaining transmission types may be configured as non-master transmission types. The master transmission type may be an example of a master transmission stream, and the non-master transmission types may be an example of non-master transmission streams. Each non-master stream is assigned with a latency tolerance limit within an acceptable user experience. Data Transmissions may be scheduled based on data being available in the master transmission type. Additionally, or alternatively, data transmissions may be scheduled based on exceeding a threshold latency tolerance (such as latency limit is reached).

In some implementations, the AR device may determine the common transmission periodicity 410 based on the master transmission type. In some examples, the common transmission periodicity 410 may be a master transmission periodicity 415 associated with the master transmission type. In some implementations, the master transmission periodicity 415 may be modified to align with the common transmission periodicity 410. For example, the master transmission periodicity 415 may be reduced to the common transmission periodicity using deep learning based prediction models.

The AR device may synchronize traffic with latency sensitive data. For example, the AR device may synchronize and schedule data transmission for non-master transmission types when data is ready to be transmitted from the master transmission type. The synchronization may ensure phase alignment among all transmission types as well as minimal latency when all transmission types are available in the Wi-Fi Firmware layer at a given time. In some implementations, a first transmission type (such as a transmission type including head pose data) may be considered as the most latency sensitive transmission type. The first transmission type may be set as the master transmission type based on user experience being highly dependent on head pose latency.

For example, the AR device may derive a common transmission periodicity 410 based on all transmitting modules (such as a component 405-a, a component 405-b, and a component 405-c). The AR device may modify transmission periodicities of some components or modules if the transmission periodicities associated with the components do not align with the common transmission periodicity 410. For example, a first transmission type may include data generated from a first component 405-a. The first transmission type may be associated with the most latency sensitive data, and the first transmission type may be the master transmission type. The first transmission type may be associated with a first transmission periodicity (such as the master transmission periodicity 415) of 500 Hz. The AR device may derive a common transmission periodicity 410 of 45 Hz based on uplink transmission types. The AR device may modify the transmission periodicity associated with one or more transmission types associated with the components 405 (such as the component 405-a, the component 405-b, or the component 405-c) based on the common transmission periodicity 410. For example, the AR device may modify the transmission periodicity associated with the master transmission type from 500 Hz to 45 Hz. Additionally, or alternatively, the AR device may modify a phase corresponding to the transmission periodicities associated with the other components 405, such that the non-master transmission streams are phase aligned with the master transmission streams. For example, a component 405-*b* may correspond to a second transmission type associated with a second transmission periodicity. The AR device may modify the second transmission periodicity to the be the common transmission periodicity (such as 45 Hz). Additionally, or alternatively, the AR device may modify a transmission time associated with the second transmission type such that the second transmission type is phase aligned the master transmission type. For example, the AR device may modify the transmission time associated with the second transmission type such that the second transmission type is transmitted at the same time as the master transmission type. In some examples, a phase of the aligned transmission types may be aligned. In some implementations, the AR device may not modify a transmission periodicity associated with a component 405-*c* based on a threshold latency tolerance associated with the respective transmission type.

The AR device may optimize the quantity of transmission handshakes for a transmission window. In some implementations, the AR device may aggregate multiple transmissions associated with multiple transmission types into the same transmission window. In some implementations, the AR device may merge concurrent data calls into a single transmission packet. The minimal handshakes associated with a common transmission periodicity avoids irregular Wi-Fi chip wakeup interrupts, which may allow the Wi-Fi chip to have a large sleep interval. For example, by aligning the transmission periodicities associated with transmission types corresponding to the components 405, the AR device may reduce Wi-Fi chip wake up interrupts and active time associated with the Wi-Fi chip.

In some implementations, the AR device may derive a common transmission periodicity 410 that is less than the transmission periodicity associated with the master transmission type. The latency impact introduced due to the periodicity change of the master transmission type (such as head pose data) may be compensated by introducing a deep learning based prediction model. For example, the AR device may derive a common periodicity of 45 Hz based on a threshold latency tolerance associated with a master transmission type associated with a transmission periodicity of 500 Hz. The AR device may compensate for the latency impact introduced by reducing the transmission periodicity of the master transmission type from 500 Hz to 45 Hz by utilizing a deep learning based prediction model to increase the threshold latency tolerance associated with the master transmission type. Additionally, or alternatively, the AR device may compensate for the latency associated with the reduced periodicity by introducing host phase alignment techniques.

For example, to attain a common transmission periodicity less than a current master transmission periodicity, the master transmission periodicity (such as head pose rate) may be reduced from 500 Hz to 45 Hz. For example, a latency increase from 2 ms to 22 ms may be introduced due to reduction in head pose transmission periodicity. The AR device may perform deep learning based predictions to reduce the periodicity associated with the master transmission periodicity. The deep learning data and the data associated with the master transmission type may be merged into a single data packet for transmission. For example, deep learning head pose data and head pose data may be merged into a single data packet. The deep learning prediction-based data (such as predicted head pose data) may reduce a latency impact created by reducing the master transmission periodicity (such as frame rate) to 45 Hz.

The AR device may determine an acceptable wait time for non-latency sensitive traffic. For example, the AR device may determine an acceptable wait time for non-latency sensitive traffic for the non-master transmission types. The AR device may analyze and evaluate latency key performance indicator (KPI) for each individual XR data associated with a component 405. Based on the latency KPI, the AR device may assign latency tolerance limit for non-latency sensitive transmission types based on the master transmission periodicity. For example, the AR device may determine a threshold latency tolerance (such as a maximum latency tolerance limit) associated with one or more transmission types. In some implementations, the AR device may determine a threshold latency tolerance associated with the third uplink transmission type associated with a first set of data generated by a camera module component 405 may be 22.22 ms. For example, the AR device may determine a threshold latency tolerance corresponding to data associated with a tracking camera may be equal to the period of the common transmission periodicity of 45 Hz (such as 22.22 ms). In some implementations, a threshold latency tolerance associated with the fourth uplink transmission type associated with a second set of data generated by the camera module component 405 (such as data associated with a RGB camera) may be 10 ms (such as a threshold latency tolerance less than the period of the common transmission periodicity of 45 Hz). For example, data associated with a RGB camera may correspond to a threshold latency tolerance of 10 ms. The threshold latency tolerance may be less than the period of the common transmission periodicity of 45 Hz. In some implementations, the AR device may not determine a threshold latency tolerance associated with the second uplink transmission type based on the second uplink transmission type being phase aligned with the master transmission type (such as head pose data). The AR device may schedule transmission for the uplink data streams based on the threshold latency tolerance. For example, the AR device may transmit an unaligned data transmission of the fourth transmission type based on exceeding the threshold latency tolerance associated with the fourth transmission before data associated with the master transmission type is ready.

Figure 5:
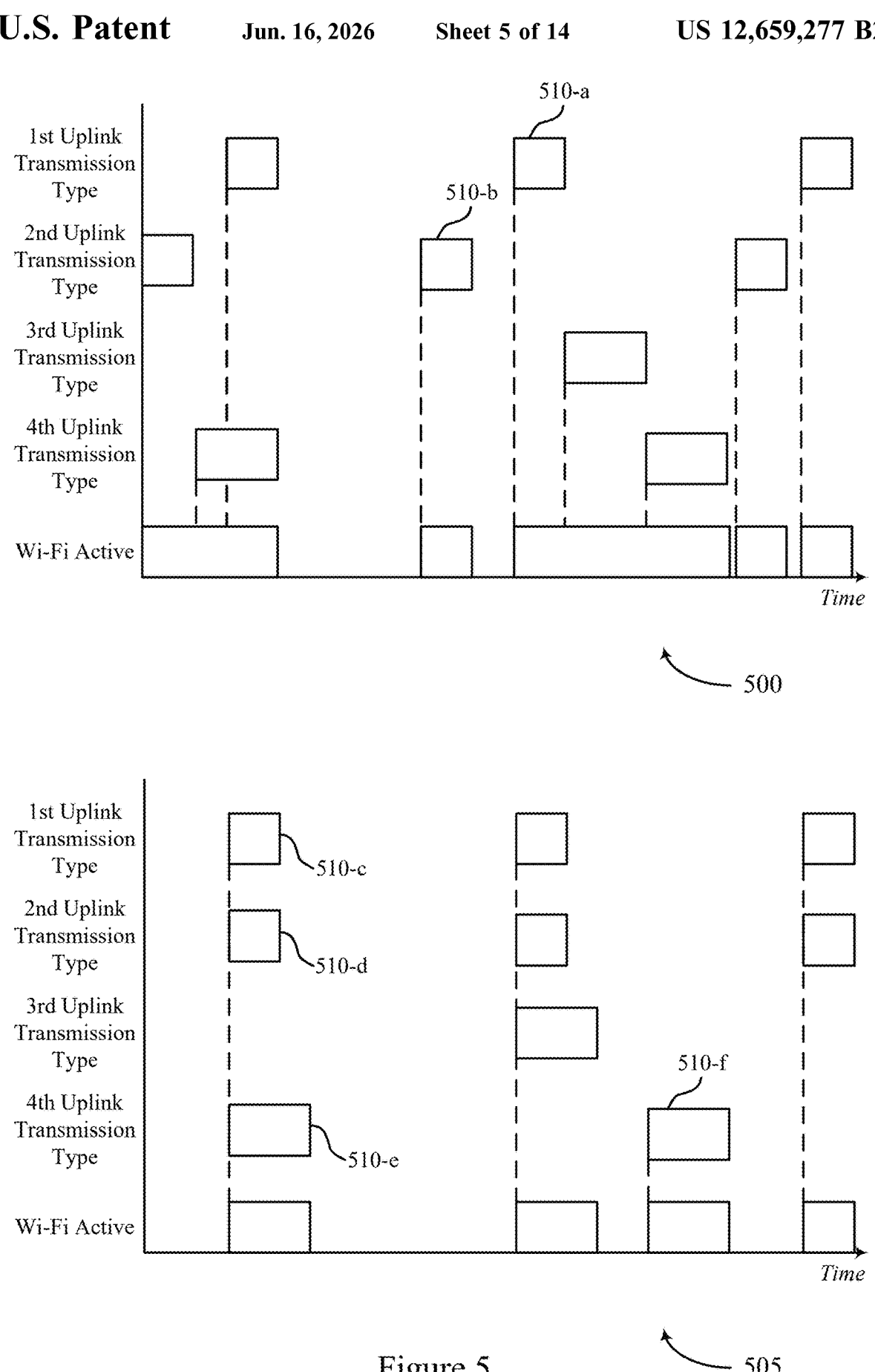
FIG. 5 shows an example of a communication timeline that supports use case aware network traffic shaping techniques for power reduction.

FIG. 5 shows an example of a communication timeline 500 and communication timeline 505 that supports use case aware network traffic shaping techniques for power reduction. In some implementations, communication timeline 500 and communication timeline 505 may implement aspects of, or be implemented by aspects of, the wireless communication system 100, the signaling diagram 200, the signaling diagram 300, or the periodicity configuration 400. For example, a UE 115 and a AR device may communicate with each other according to the communication timeline 500 or the communication timeline 505. The UE 115 may be an example of one or more aspects of a UE 115 as described herein, including with reference to FIGS. 1-4. The AR device may be an example of one or more aspects of an AR device (such as the AR device 205 or the AR device 305) as described herein, including with reference to FIGS. 1-4.

The AR device (e.g., a wireless device) may transmit one or more data transmissions to the UE 115 associated with one or more transmission types. The communication timeline 500 may represent the uplink communication between the AR device and the UE 115 without performing transmission aggregation. For example, the communication timeline 500 may represent communication between the AR device and the UE 115 without transmission alignment or phase alignment. For example, the AR device may transmit a first data transmission 510-*a* of the first transmission type unaligned with a second data transmission 510-*b* of the second transmission type.

According to techniques described herein, the AR device may schedule uplink transmissions (such as network traffic transmissions) based on the master transmission periodicity. For example, the AR device may adjust transmission times for non-latency sensitive transmission types to achieve phase alignment with the first transmission type. For example, the AR device may adjust transmission times for non-latency sensitive transmission types to achieve phase alignment with a transmission including head-pose data. The AR device may adjust data generation or data transmission time for the non-master transmission types to align with the master transmission type transmission time. Additionally, or alternatively, the AR device may hold data using a latency manager until data associated with the master transmission type is ready to transmit. In some implementations, a traffic scheduler signaling mechanism may be timed precisely such that the traffic scheduler signaling mechanism compensates for the software overheads (such as latency) for data to be available in the Wi-Fi firmware.

For example, as illustrated in the communication timeline 505, the AR device may modify transmission times associated with the non-master transmission types (such as the second uplink transmission type, the third uplink transmission type, and the fourth uplink transmission type). For example, the AR device may modify transmission times associated with the non-master transmission types such that the non-master transmission types are phase aligned with or transmitted at the same time as the master transmission type. As illustrated with reference to the communication timeline 505, a first data transmission 510-*c* associated with the first uplink transmission type may be an example of a master transmission type. A second data transmission 510-*d* associated with the second uplink transmission type, and a third data transmission 510-*e* associated with the fourth uplink transmission type may be aligned. The AR device may transmit the first data transmission 510-*c*, the second data transmission 510-*d*, and the third data transmission 510-*e* at the same time or as part of the same transmission. The communication timeline 505 may be associated with a lower Wi-Fi active time and lower power consumption compared to the communication timeline 500. For example, the AR device may be able to enter a sleep mode more often between aligned transmission of multiple types of transmission when communicating in accordance with communication timeline 505.

In some implementations, a fourth data transmission 510-*f* may be unaligned with the master transmission type based on exceeding the threshold latency tolerance associated with the fourth uplink transmission type. For example, the data associated with the fourth data transmission 510-*f* may not be available during a transmission of the master transmission type, and the data may exceed the threshold latency tolerance associated with the fourth data transmission 510-*f* prior to the next available transmission of the master transmission type.

For example, head pose data may be derived as the master transmission type based on the latency KPI analysis. The traffic scheduling and signaling mechanism may be enabled using a traffic scheduler linked with head pose thread. The traffic scheduler may support multiple process scheduling and wake signaling mechanisms among different XR software modules or layers with minimal latency (such as components as described with reference to FIGS. 3 and 4).

Non-master transmission types including the statistics data, the tracking camera data, or RGB camera data (as the second transmission type, the third transmission type, or the fourth transmission type, for example) may wait for a traffic scheduler signal to transmit data. Components or threads in the AR device may adjust transmission times based on data generation times associated with the master transmission type. For example, data generation time may be adjusted for a statistics thread based on the head pose generation time. Some transmission types such as the RGB camera configured at a transmission periodicity may not be altered for traffic shaping based on a threshold latency tolerance associated with the transmission type. For example, the RGB camera may not alter a transmission of 30 FPS based on the threshold latency tolerance.

Figure 6:
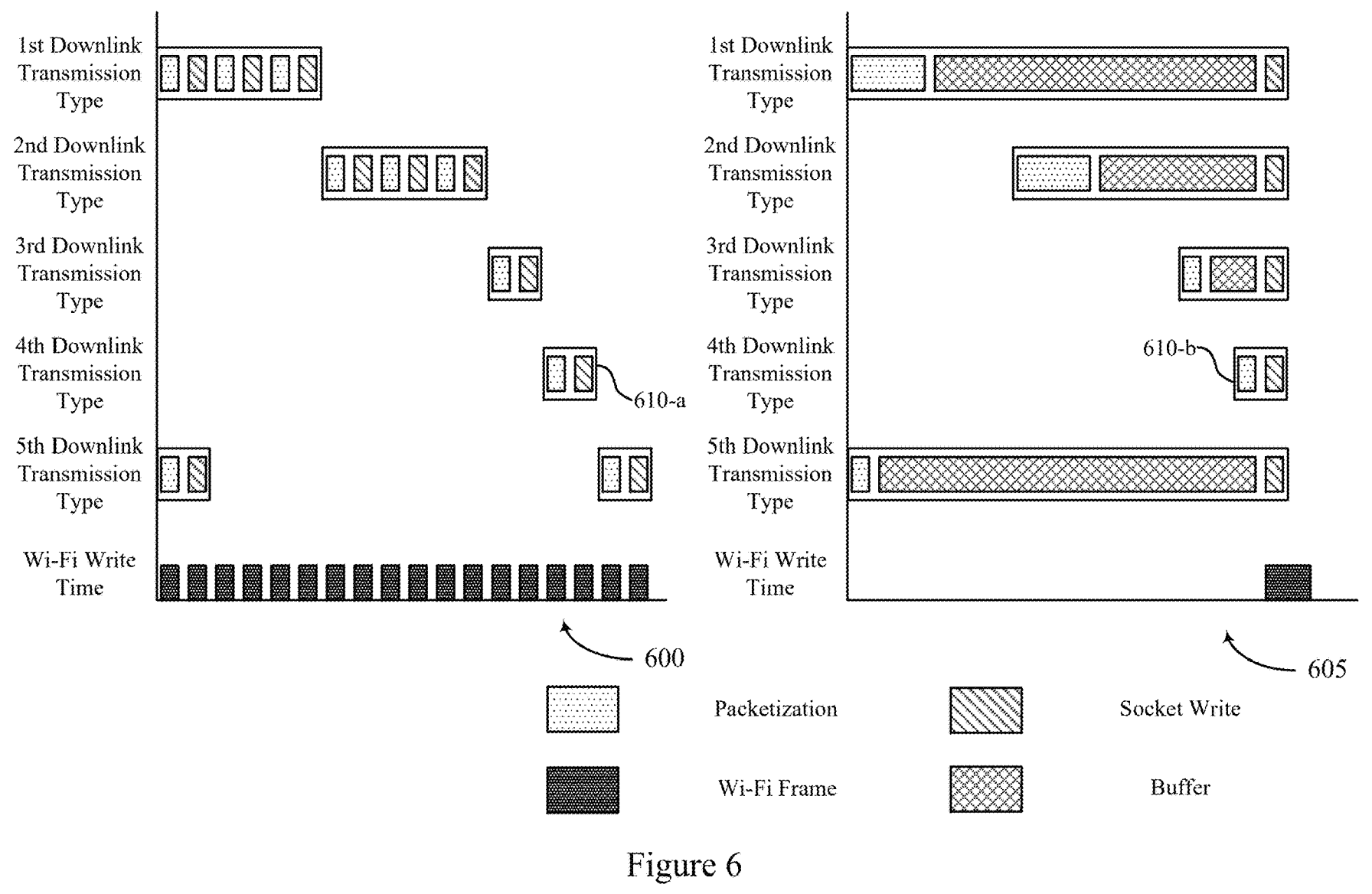

FIG. 6 shows an example of a transmission timeline 600 that supports use case aware network traffic shaping techniques for power reduction. In some implementations, transmission timeline 600 may implement aspects of, or be implemented by aspects of, the wireless communication system 100, the signaling diagram 200, the signaling diagram 300, the periodicity configuration 400, or the communication timeline 500. For example, a UE 115 and a AR device, which may be examples of corresponding devices described with reference to FIGS. 1-5, may communicate with each other according to the communication timeline 500. The UE 115 may be an example of one or more aspects of a UE 115 as described herein, including with reference to FIGS. 1-5. The AR device may be an example of one or more aspects of an AR device (such as the AR device 205 or the AR device 305) as described herein, including with reference to FIGS. 1-5.

The UE 115 may transmit one or more data transmissions 610 to the AR device (e.g., a wireless device) associated with one or more downlink transmission types. For example, the UE 115 may transmit a data transmission 610-*a* or a data transmission 610-*b*. The transmission timeline 600 may represent the uplink communication between the AR device and the UE 115 prior to transmission aggregation (such as transmission alignment). For example, the UE 115-*a* may alternate performing packetization and socket write for each downlink transmission type.

According to techniques described herein, the UE 115 may aggregate one or more data transmissions associated with one or more downlink transmission types to a single Wi-Fi frame. For example, the UE 115 may aggregate one or more the downlink data and transmissions at once to the Wi-Fi layer to achieve higher Wi-Fi idle time.

For example, the UE 115 may align multiple transmission periodicities to a common periodicity (such as frequency). The alignment may ensure the data associated with the multiple transmission periodicities is available at regular intervals for transmission. The UE 115 may reduce a quantity of Wi-Fi transmission requests. For example, the UE 115 may increase an IP level MTU size of each transmission to reduce the Wi-Fi transmission requests. The UE 115 may reduce software scheduling latencies. For example, the UE 115 may assign each transmission thread to a dedicated CPU core to reduce software latencies. The UE 115 may perform a relaxed or coordinated transmission technique to aggregate multiple downlink transmission types and transmit data associated with multiple downlink transmission types at the same time (such as in a single Wi-Fi frame).

To maintain a minimal quantity of socket calls for each transmitting data, the UE 115 may increase the MTU size. For example, the UE 115 may increase the MTU size to 64 kilobytes (KB) for Video and 6 kB for Audio from a traditional 1500 bytes to reduce the software latency. The UE 115 may transmit data associated with the multiple transmission types (such as audio data, depth data, or video data) after all data is ready for transmission and packetized. In some implementations, an audio sampling rate (such as 100 Hz) may not match with a video transmission periodicity (such as 45 Hz). The UE 115 may store the data in an intermediate buffer and wait for the last video stream to be available. In some implementations, to overcome the latency of audio, a jitter buffer at the AR device (such as companion side) may be increased by a few ms. In some implementations, to overcome the latency of audio at the AR device, a jitter buffer may be increased by a few ms. The UE 115 may assign or affine downlink transmission types (such as downlink video, depth, and audio ports) to specific CPU cores to reduce socket write time. The dedicated CPU cores may decrease latency associated with generating the single Wi-Fi frame at the Wi-Fi Firmware layer. The UE 115 may buffer (hold) all downlink transmission types) until the last video stream arrives, and the UE 115 may write to one or more sockets simultaneously.

For example, as illustrated in communication timeline 605, the UE 115 may packetize data associated with a first downlink transmission type. Additionally, or alternatively, the UE 115 may packetize data associated with an additional downlink transmission type (such as the fifth downlink transmission type) at the same time. The UE 115 may buffer the data associated with the first downlink transmission type and the fifth downlink transmission type until packetization is complete for multiple downlink transmission types (such as the first downlink transmission type, the second downlink transmission type, the third downlink transmission type, the fourth downlink transmission type, and the fifth downlink transmission type). The UE 115 may packetize and buffer data associated with the second downlink transmission type. The UE 115 may packetize and buffer data associated with the third downlink transmission type. The UE 115 may packetize data associated with the fourth downlink transmission type (such as video data). After the UE 115 performs packetization for the multiple downlink transmission types, the UE 115 may perform a simultaneous socket write for each downlink transmission type.

The UE 115 may transmit data associated with the multiple transmission types in a single Wi-Fi frame. As illustrated in FIG. 6, the communication timeline 605 may reduce the Wi-Fi write time compared to the transmission timeline 600. The Wi-Fi chip at the AR device may increase idle time based on performing a simultaneous socket write at the UE 115.

Figure 7:
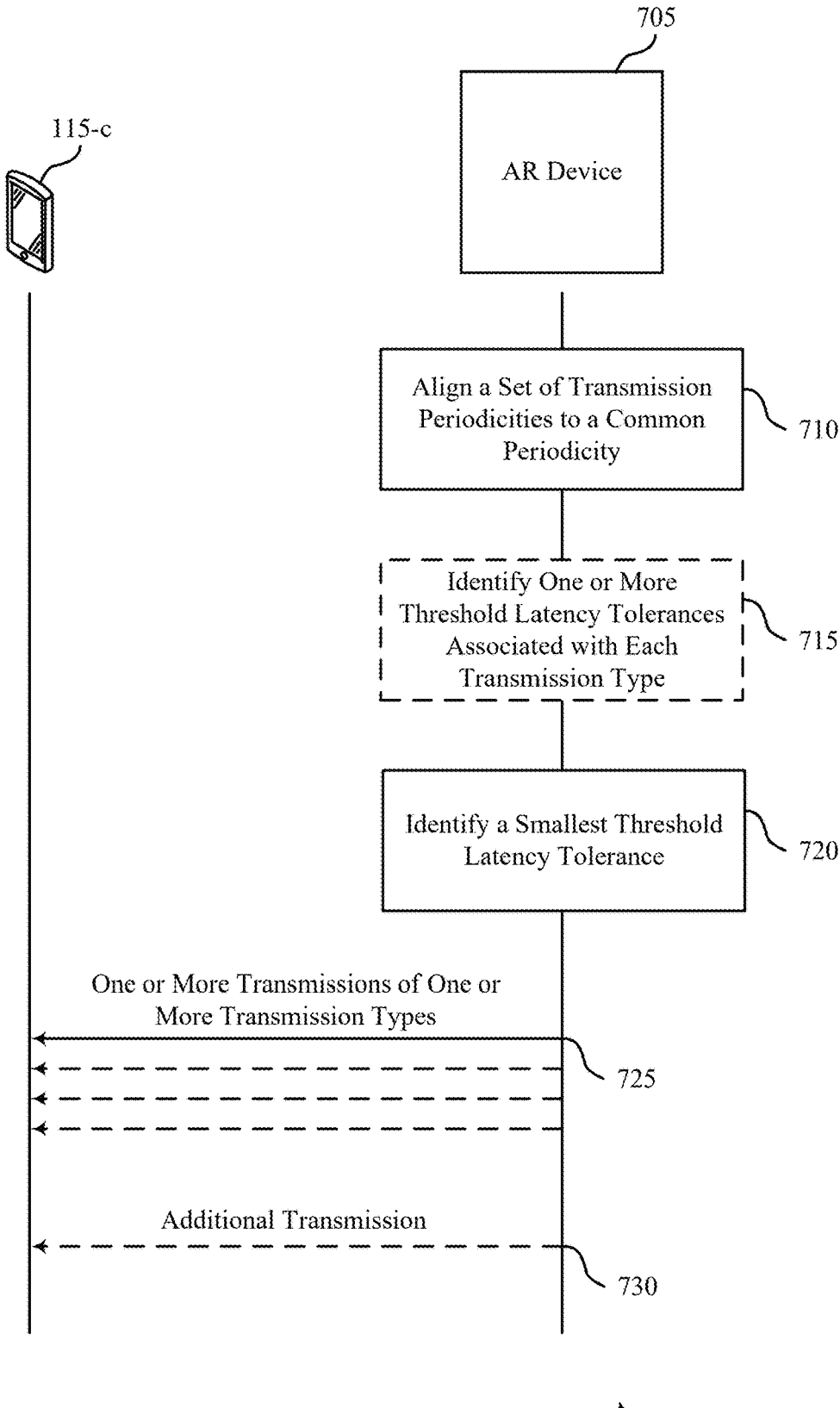
FIG. 7 shows an example of a process flow that supports use case aware network traffic shaping techniques for power reduction.

FIG. 7 shows an example of a process flow 700 that supports use case aware network traffic shaping techniques for power reduction. In some implementations, process flow 700 may implement aspects of, or be implemented by aspects of, the wireless communication system 100, the signaling diagram 200, the signaling diagram 300, the periodicity configuration 400, the communication timeline 500, or the transmission timeline 600. For example, the process flow 700 may include a UE 115-*c* and an AR device 705. The UE 115-*c* may be an example of one or more aspects of a UE 115 as described herein, including with reference to FIGS. 1-6. The AR device 705 device may be an example of one or more aspects of an AR device (such as the AR device 205 or the AR device 305) or a wireless device as described herein, including with reference to FIGS. 1-6.

At 710, the AR device 705 (e.g., the wireless device) may align a set of transmission periodicities associated with a set of transmission types to a common periodicity corresponding to a master transmission type of the set of transmission types based on a modification to at least one transmission periodicity of the set of transmission periodicities. A threshold latency tolerance associated with the master transmission type may be based on the common periodicity. The master transmission type may be associated with a smallest threshold latency tolerance of the set of transmission types. In some implementations, the master transmission type may correspond to positional data associated with the AR device 705.

In some implementations, the AR device 705 may generate first data associated with the master transmission type. A first transmission of one or more transmissions may include the first data. Transmitting the one or more transmissions may include transmitting the first data associated with the master transmission type and at least second data associated with a second transmission type of the set of transmission types at a transmission timing corresponding to the first data. In some implementations, the AR device 705 may adjust data generation timing associated with a subset of transmission types to align with a transmission time associated with the master transmission type based on the common periodicity. Transmitting the one or more transmissions associated with the subset of transmission types at the common periodicity may be based on the adjusted data generation time.

In some implementations, at 715, the AR device 705 may identify one or more threshold latency tolerances associated with each transmission type of the set of transmission types. In some implementations, the AR device 705 may increase the smallest threshold latency tolerance associated with the master transmission type based on a deep learning based prediction model output corresponding to the master transmission type.

At 720, the AR device 705 may identify the threshold latency tolerance associated with the master transmission type based on the common periodicity. The master transmission type may be associated with a smallest threshold latency tolerance of the set of transmission types.

In some implementations, the AR device 705 may buffer data associated with the subset of transmission types prior to a transmission corresponding to the master transmission type. Transmitting the one or more transmissions at the common periodicity may be based on the buffering.

At 725, the AR device 705 may transmit one or more transmissions corresponding to one or more respective transmission types of the set of transmission types at the common periodicity and according to the smallest threshold latency tolerance. In some implementations, the AR device 705 may synchronize the one or more transmissions corresponding to the one or more respective transmission types based on a data availability associated with the master transmission type. The one or more transmissions may be phase aligned based on the synchronizing.

In some implementations, the AR device 705 may merge concurrent data corresponding to the one or more transmissions into a single message. Transmitting the one or more transmissions may include transmitting the single message. In some implementations, a packet size associated with the one or more transmissions may be based on a threshold transmit unit size. The packet size may not exceed the threshold transmit unit size. In some implementations, the AR device may transmit the one or more transmissions via a single Wi-Fi frame. In some implementations, the AR device may transmit the one or more transmissions via one or more neighboring Wi-Fi frames. A network type of service (ToS) value may be maintained as a common value across multiple transmitting streams. The common value may aid in aligning the data associated with the transmitting streams into a single Wi-Fi Frame for transmission. The multiple transmitting streams may be uplink transmission types or downlink transmission types.

In some implementations, at 730, the AR device 705 may transmit an additional transmission corresponding to a first transmission type of the one or more respective transmission types based on a determination that a respective threshold latency tolerance of the one or more threshold latency tolerances associated with the first transmission type of the one or more respective transmission types has been exceeded.

Figure 8:
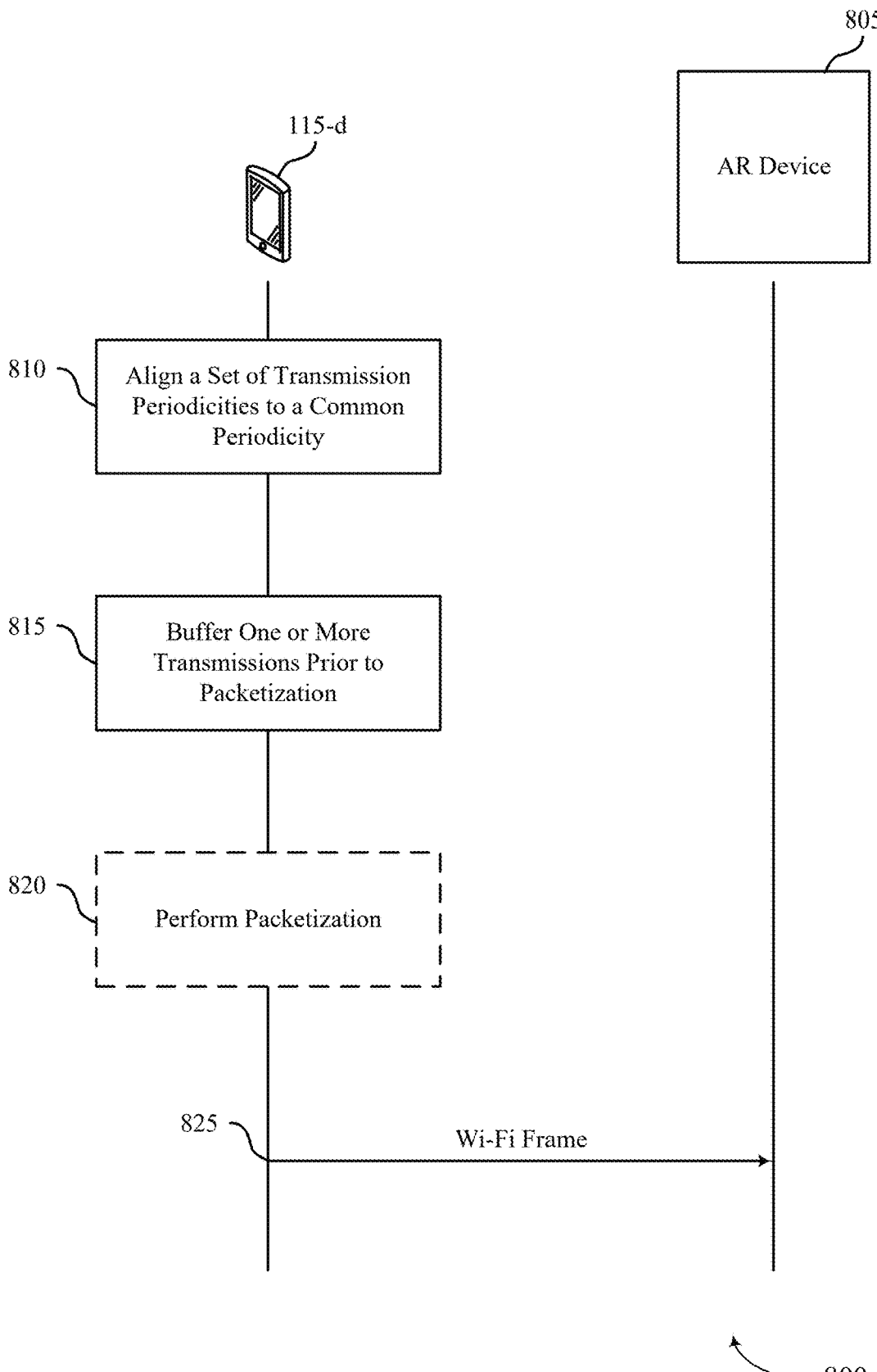
FIG. 8 shows an example of a process flow that supports use case aware network traffic shaping techniques for power reduction.

FIG. 8 shows an example of a process flow 800 that supports use case aware network traffic shaping techniques for power reduction. In some implementations, process flow 800 may implement aspects of, or be implemented by aspects of, the wireless communication system 100, the signaling diagram 200, the signaling diagram 300, the periodicity configuration 400, communication timeline 500, the transmission timeline 600, or the process flow 700. For example, the process flow 800 may include a UE 115-*d* and an AR device 805 which may be examples of corresponding devices described with reference to FIGS. 1-7. The UE 115-*d* may be an example of one or more aspects of a UE 115 as described herein, including with reference to FIGS. 1-7. The AR device 805 device may be an example of one or more aspects of an AR device (such as the AR device 205, the AR device 305, or the AR device 705) or a wireless device as described herein, including with reference to FIGS. 1-7.

At 810, the UE 115-*d* may align a set of transmission periodicities associated with a set of transmission types to a common periodicity. In some implementations, a packet size associated with a transmissions type may be based on a latency threshold associated with the transmission type. The packet size may be based on a threshold transmit unit size, where the packet size may not exceed the threshold transmit unit size.

At 815, the UE 115-*d* may buffer one or more transmissions of a set of transmissions corresponding to the set of transmission types prior to performing packetization associated with at least one transmission of the set of transmissions. In some implementations, at least one transmission of the set of transmissions may correspond to a transmission type associated with video data.

In some implementations, at 820, the UE 115-*d* may perform packetization associated with the set of transmissions, as described with reference to FIG. 6.

At 825, the UE 115-*d* may transmit the set of transmissions at the common periodicity via a single frame based on performing the packetization associated with the set of transmissions. In some implementations, the UE 115-*d* may perform a socket write for each transmission of the set of transmissions simultaneously. In some implementations, processing associated with each transmission of the set of transmissions may be assigned a dedicated CPU core. In some implementations, the single frame may be a single Wi-Fi frame.

In some examples, the UE 115-*d* and the AR device 805 (e.g., a wireless device) examples of peer-to-peer network devices in a peer-to-peer network. The UE 115-*d* and the AR device 805 may communicate via multiple transmission types at multiple transmission periodicities. The traffic shaping techniques described herein may be implemented to optimize network and CPU and power consumption.

Figure 9:
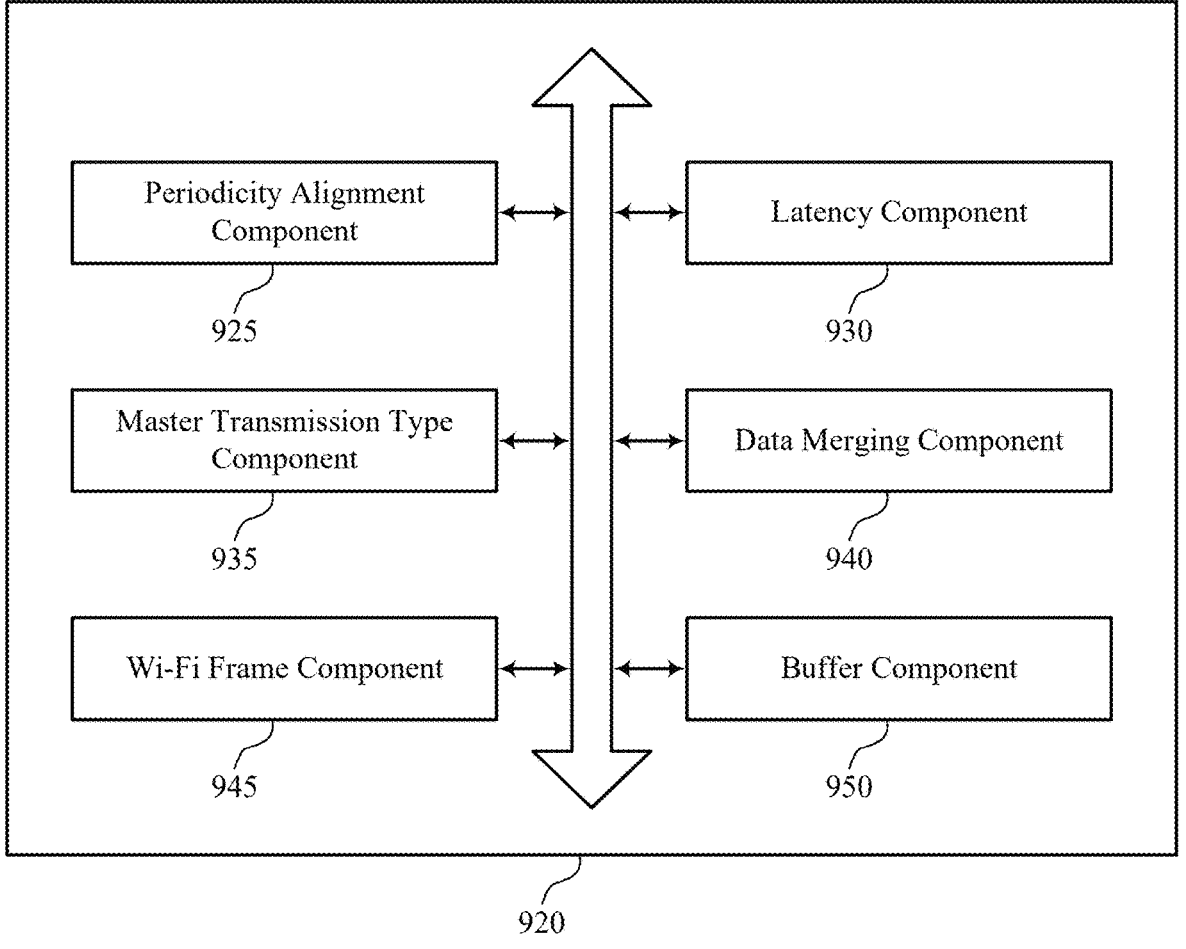
FIG. 9 shows a block diagram of a communications manager that supports use case aware network traffic shaping techniques for power reduction.

FIG. 9 shows a block diagram 900 of an AR device 920 that supports use case aware network traffic shaping techniques for power reduction. The AR device 920 may be an example of aspects of an AR device or a wireless device as described with reference to FIGS. 1 through 8. The AR device 920, or various components thereof, may be an example of means for performing various aspects of use case aware network traffic shaping techniques for power reduction as described herein. For example, the AR device 920 may include a periodicity alignment component 925, a latency component 930, a master transmission type component 935, a data merging component 940, a Wi-Fi frame component 945, a buffer component 950, or any combination thereof. Each of these components, or components or subcomponents thereof (such as one or more processors, one or more memories), may communicate, directly or indirectly, with one another (such as via one or more buses).

The AR device 920 (e.g., a wireless device) may support wireless communications in accordance with examples as disclosed herein. The periodicity alignment component 925 is capable of, configured to, or operable to support a means for aligning a set of transmission periodicities associated with a set of transmission types to a common periodicity corresponding to a master transmission type of the set of transmission types based on a modification to at least one transmission periodicity of the set of transmission periodicities, wherein a threshold latency tolerance associated with the master transmission type is based on the common periodicity, where the master transmission type is associated with a smallest threshold latency tolerance of the set of transmission types. In some examples, the periodicity alignment component 925 is capable of, configured to, or operable to support a means for transmitting one or more transmissions corresponding to one or more respective transmission types of the set of transmission types at the common periodicity and according to the smallest threshold latency tolerance.

In some examples, to support transmitting the one or more transmissions, the master transmission type component 935 is capable of, configured to, or operable to support a means for generating first data associated with the master transmission type, where a first transmission of the one or more transmissions includes the first data, where transmitting the one or more transmissions includes transmitting the first data associated with the master transmission type and at least second data associated with a second transmission type of the set of transmission types at a transmission timing corresponding to the first data.

In some examples, the latency component 930 is capable of, configured to, or operable to support a means for identifying one or more threshold latency tolerances associated with each transmission type of the set of transmission types. In some examples, the latency component 930 is capable of, configured to, or operable to support a means for transmitting an additional transmission corresponding to a first transmission type of the one or more respective transmission types based on a determination that a respective threshold latency tolerance of the one or more threshold latency tolerances associated with the first transmission type of the one or more respective transmission types has been exceeded.

In some examples, the periodicity alignment component 925 is capable of, configured to, or operable to support a means for synchronizing the one or more transmissions corresponding to the one or more respective transmission types based on a data availability associated with the master transmission type, where the one or more transmissions are phase aligned based on the synchronizing.

In some examples, the data merging component 940 is capable of, configured to, or operable to support a means for merging concurrent data corresponding to the one or more transmissions into a single message, where transmitting the one or more transmissions includes transmitting the single message.

In some examples, a packet size associated with the one or more transmissions is based on a threshold transmit unit size. In some examples, the packet size does not exceed the threshold transmit unit size.

In some examples, to support transmitting the one or more transmissions, the Wi-Fi frame component 945 is capable of, configured to, or operable to support a means for transmitting the one or more transmissions via a single Wi-Fi frame.

In some examples, the latency component 930 is capable of, configured to, or operable to support a means for increasing the smallest threshold latency tolerance associated with the master transmission type based on a deep learning based prediction model output corresponding to the master transmission type.

In some examples, the periodicity alignment component 925 is capable of, configured to, or operable to support a means for adjusting data generation timing associated with a subset of transmission types to align with a transmission time associated with the master transmission type based on the common periodicity, where transmitting the one or more transmissions associated with the subset of transmission types at the common periodicity is based on the adjusted data generation time.

In some examples, to support adjusting the transmission time, the buffer component 950 is capable of, configured to, or operable to support a means for buffering data associated with the subset of transmission types prior to a transmission corresponding to the master transmission type, where transmitting the one or more transmissions at the common periodicity is based on the buffering.

In some examples, the master transmission type corresponds to positional data associated with the AR device.

Figure 10:
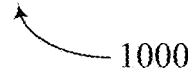
FIG. 10 shows a diagram of a system including a device that supports use case aware network traffic shaping techniques for power reduction.

FIG. 10 shows a diagram of a system 1000 including a device 1005 that supports use case aware network traffic shaping techniques for power reduction. The device 1005 may include components for bi-directional voice and data communications including components for transmitting and receiving communications, such as a communications manager 1020, a transceiver 1010, one or more antennas 1015, at least one memory 1025, code 1030, and at least one processor 1035. These components may be in electronic communication or otherwise coupled (such as operatively, communicatively, functionally, electronically, electrically) via one or more buses (such as a bus 1040).

The transceiver 1010 may support bi-directional communications via wired links, wireless links, or both as described herein. In some examples, the transceiver 1010 may include a wired transceiver and may communicate bi-directionally with another wired transceiver. Additionally, or alternatively, in some examples, the transceiver 1010 may include a wireless transceiver and may communicate bi-directionally with another wireless transceiver. In some examples, the device 1005 may include one or more antennas 1015, which may be capable of transmitting or receiving wireless transmissions (such as concurrently). The transceiver 1010 also may include a modem to modulate signals, to provide the modulated signals for transmission (such as by one or more antennas 1015, by a wired transmitter), to receive modulated signals (such as from one or more antennas 1015, from a wired receiver), and to demodulate signals. In some implementations, the transceiver 1010 may include one or more interfaces, such as one or more interfaces coupled with the one or more antennas 1015 that are configured to support various receiving or obtaining operations, or one or more interfaces coupled with the one or more antennas 1015 that are configured to support various transmitting or outputting operations, or a combination thereof. In some implementations, the transceiver 1010 may include or be configured for coupling with one or more processors or one or more memory components that are operable to perform or support operations based on received or obtained information or signals, or to generate information or other signals for transmission or other outputting, or any combination thereof. In some implementations, the transceiver 1010, or the transceiver 1010 and the one or more antennas 1015, or the transceiver 1010 and the one or more antennas 1015 and one or more processors or one or more memory components (such as the at least one processor 1035, the at least one memory 1025, or both), may be included in a chip or chip assembly that is installed in the device 1005. In some examples, the transceiver 1010 may be operable to support communications via one or more communications links (such as communication link(s) 125, backhaul communication link(s) 120, a midhaul communication link 162, a fronthaul communication link 168).

The at least one memory 1025 may include RAM, ROM, or any combination thereof. The at least one memory 1025 may store computer-readable, computer-executable, or processor-executable code, such as the code 1030. The code 1030 may include instructions that, when executed by one or more of the at least one processor 1035, cause the device 1005 to perform various functions described herein. The code 1030 may be stored in a non-transitory computer-readable medium such as system memory or another type of memory. In some implementations, the code 1030 may not be directly executable by a processor of the at least one processor 1035 but may cause a computer (such as when compiled and executed) to perform functions described herein. In some implementations, the at least one memory 1025 may include, among other things, a BIOS which may control basic hardware or software operation such as the interaction with peripheral components or devices. In some examples, the at least one processor 1035 may include multiple processors and the at least one memory 1025 may include multiple memories. One or more of the multiple processors may be coupled with one or more of the multiple memories which may, individually or collectively, be configured to perform various functions herein (such as part of a processing system).

The at least one processor 1035 may include one or more intelligent hardware devices (such as one or more general-purpose processors, one or more DSPs, one or more CPUs, one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some implementations, the at least one processor 1035 may be configured to operate a memory array using a memory controller. In some other implementations, a memory controller may be integrated into one or more of the at least one processor 1035. The at least one processor 1035 may be configured to execute computer-readable instructions stored in a memory (such as one or more of the at least one memory 1025) to cause the device 1005 to perform various functions (such as functions or tasks supporting use case aware network traffic shaping techniques for power reduction). For example, the device 1005 or a component of the device 1005 may include at least one processor 1035 and at least one memory 1025 coupled with one or more of the at least one processor 1035, the at least one processor 1035 and the at least one memory 1025 configured to perform various functions described herein. The at least one processor 1035 may be an example of a cloud-computing platform (such as one or more physical nodes and supporting software such as operating systems, virtual machines, or container instances) that may host the functions (such as by executing code 1030) to perform the functions of the device 1005. The at least one processor 1035 may be any one or more suitable processors capable of executing scripts or instructions of one or more software programs stored in the device 1005 (such as within one or more of the at least one memory 1025).

In some examples, the at least one processor 1035 may include multiple processors and the at least one memory 1025 may include multiple memories. One or more of the multiple processors may be coupled with one or more of the multiple memories, which may, individually or collectively, be configured to perform various functions herein. In some examples, the at least one processor 1035 may be a component of a processing system, which may refer to a system (such as a series) of machines, circuitry (including, for example, one or both of processor circuitry (which may include the at least one processor 1035) and memory circuitry (which may include the at least one memory 1025)), or components, that receives or obtains inputs and processes the inputs to produce, generate, or obtain a set of outputs. The processing system may be configured to perform one or more of the functions described herein. For example, the at least one processor 1035 or a processing system including the at least one processor 1035 may be configured to, configurable to, or operable to cause the device 1005 to perform one or more of the functions described herein. Further, as described herein, being "configured to," being "configurable to," and being "operable to" may be used interchangeably and may be associated with a capability, when executing code stored in the at least one memory 1025 or otherwise, to perform one or more of the functions described herein.

In some examples, a bus 1040 may support communications of (such as within) a protocol layer of a protocol stack. In some examples, a bus 1040 may support communications associated with a logical channel of a protocol stack (such as between protocol layers of a protocol stack), which may include communications performed within a component of the device 1005, or between different components of the device 1005 that may be co-located or located in different locations (such as where the device 1005 may refer to a system in which one or more of the communications manager 1020, the transceiver 1010, the at least one memory 1025, the code 1030, and the at least one processor 1035 may be located in one of the different components or divided between different components).

In some examples, the communications manager 1020 may manage aspects of communications with a core network 130 (such as via one or more wired or wireless backhaul links). For example, the communications manager 1020 may manage the transfer of data communications for client devices, such as one or more UEs 115. In some examples, the communications manager 1020 may manage communications with one or more other network entities 105, and may include a controller or scheduler for controlling communications with UEs 115 (such as in cooperation with the one or more other network devices). In some examples, the communications manager 1020 may support an X2 interface within an LTE/LTE-A wireless communications network technology to provide communication between network entities 105.

The communications manager 1020 may support wireless communications in accordance with examples as disclosed herein. For example, the communications manager 1020 is capable of, configured to, or operable to support a means for aligning a set of transmission periodicities associated with a set of transmission types to a common periodicity corresponding to a master transmission type of the set of transmission types based on a modification to at least one transmission periodicity of the set of transmission periodicities, wherein a latency tolerance associated with the master transmission type is based on the common periodicity, where the master transmission type is associated with a smallest threshold latency tolerance of the set of transmission types. The communications manager 1020 is capable of, configured to, or operable to support a means for transmitting one or more transmissions corresponding to one or more respective transmission types of the set of transmission types at the common periodicity and according to the smallest threshold latency tolerance.

In some examples, the communications manager 1020 may be configured to perform various operations (such as receiving, obtaining, monitoring, outputting, transmitting) using or otherwise in cooperation with the transceiver 1010, the one or more antennas 1015 (such as where applicable), or any combination thereof. Although the communications manager 1020 is illustrated as a separate component, in some examples, one or more functions described with reference to the communications manager 1020 may be supported by or performed by the transceiver 1010, one or more of the at least one processor 1035, one or more of the at least one memory 1025, the code 1030, or any combination thereof (such as by a processing system including at least a portion of the at least one processor 1035, the at least one memory 1025, the code 1030, or any combination thereof). For example, the code 1030 may include instructions executable by one or more of the at least one processor 1035 to cause the device 1005 to perform various aspects of use case aware network traffic shaping techniques for power reduction as described herein, or the at least one processor 1035 and the at least one memory 1025 may be otherwise configured to, individually or collectively, perform or support such operations.

Figure 11:
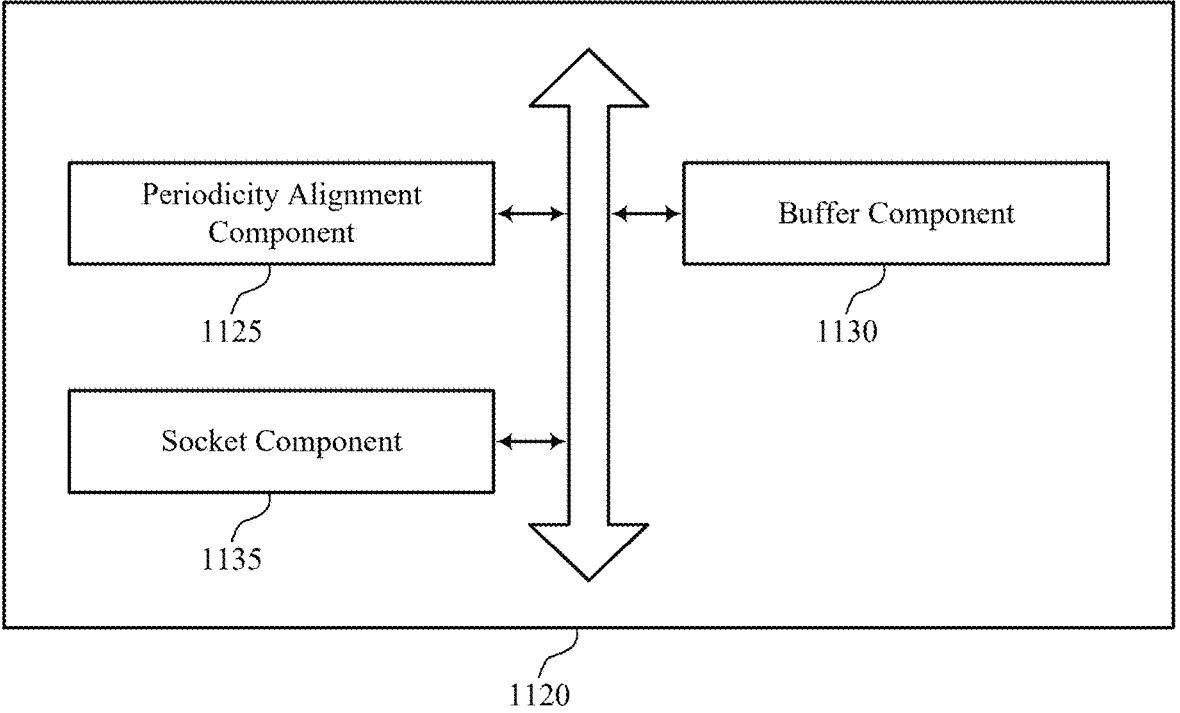
FIG. 11 shows a block diagram of a communications manager that supports use case aware network traffic shaping techniques for power reduction.
Figure 11:

FIG. 11 shows a block diagram 1100 of a UE 1120 that supports use case aware network traffic shaping techniques for power reduction. The UE 1120 may be an example of aspects of a UE as described with reference to FIGS. 1 through 8. The UE 1120, or various components thereof, may be an example of means for performing various aspects of use case aware network traffic shaping techniques for power reduction as described herein. For example, the UE 1120 may include a periodicity alignment component 1125, a buffer component 1130, a socket component 1135, or any combination thereof. Each of these components, or components or subcomponents thereof (such as one or more processors, one or more memories), may communicate, directly or indirectly, with one another (such as via one or more buses).

The UE 1120 may support wireless communications in accordance with examples as disclosed herein. The periodicity alignment component 1125 is capable of, configured to, or operable to support a means for aligning a set of transmission periodicities associated with a set of transmission types to a common periodicity. The buffer component 1130 is capable of, configured to, or operable to support a means for buffering one or more transmissions of a set of multiple transmissions corresponding to the set of transmission types prior to performing packetization associated with at least one transmission of the set of multiple transmissions. In some examples, the periodicity alignment component 1125 is capable of, configured to, or operable to support a means for transmitting the set of multiple transmissions at the common periodicity via a single frame based on performing the packetization associated with the set of multiple transmissions.

In some examples, to support transmitting the set of multiple transmissions at the common periodicity, the socket component 1135 is capable of, configured to, or operable to support a means for performing a socket write for each transmission of the set of multiple transmissions simultaneously.

In some examples, the packet size is based on a threshold transmit unit size. In some examples, the packet size does not exceed the threshold transmit unit size.

In some examples, processing associated with each transmission of the set of multiple transmissions is assigned a dedicated CPU core.

In some examples, the at least one transmission of the set of multiple transmissions corresponds to a transmission type associated with video data.

In some examples, the single frame is a single Wi-Fi frame.

In some examples, a packet size associated with a transmission type is based on a latency threshold associated with the transmission type.

Figure 12:
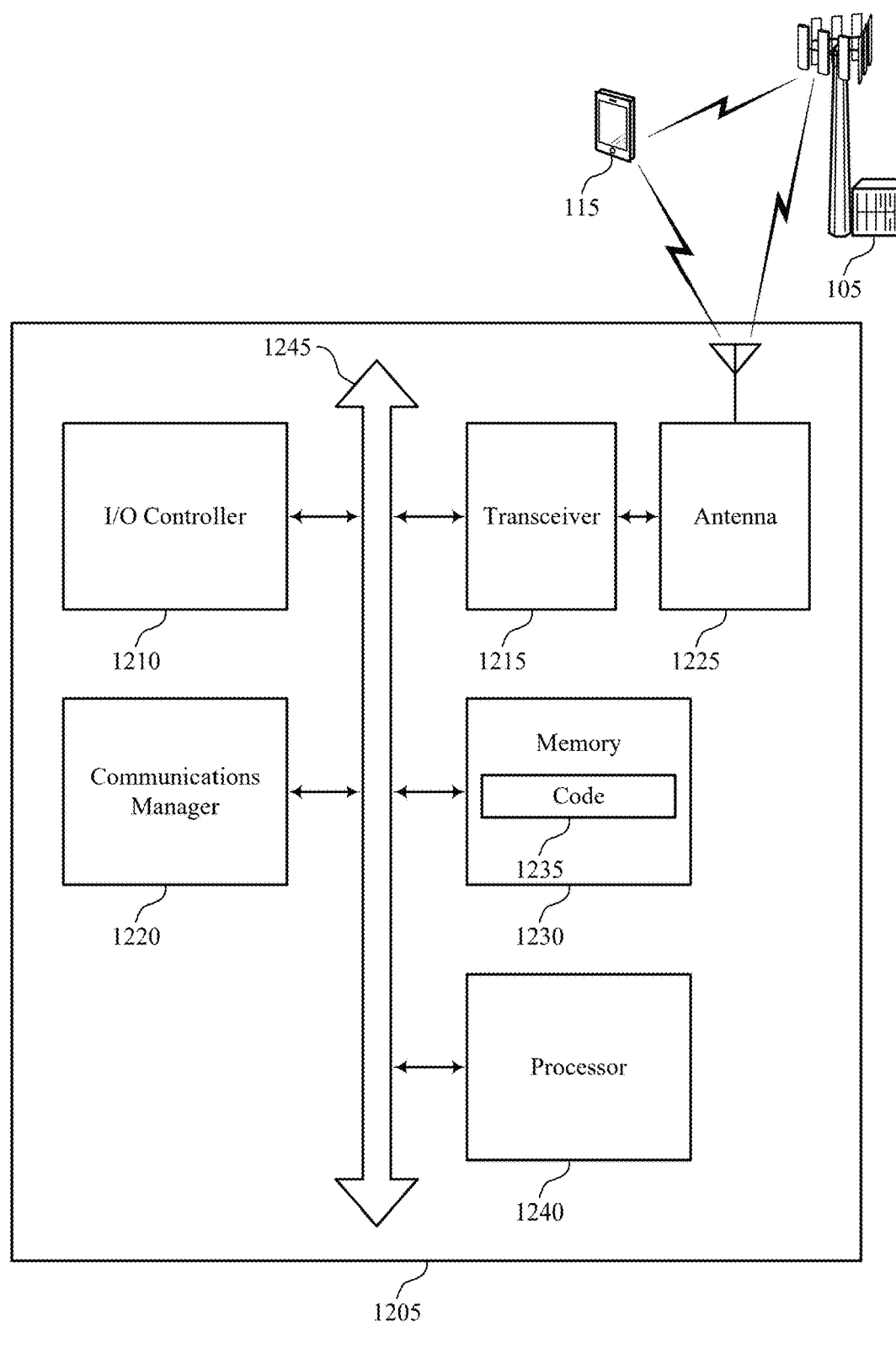
FIG. 12 shows a diagram of a system including a device that supports use case aware network traffic shaping techniques for power reduction.

FIG. 12 shows a diagram of a system 1200 including a device 1205 that supports use case aware network traffic shaping techniques for power reduction. The device 1205 may communicate (such as wirelessly) with one or more network entities (such as one or more components of one or more BSs 105), one or more UEs 115, or any combination thereof. The device 1205 may include components for bi-directional voice and data communications including components for transmitting and receiving communications, such as a communications manager 1220, an input/output (I/O) controller, such as an I/O controller 1210, a transceiver 1215, one or more antennas 1225, at least one memory 1230, code 1235, and at least one processor 1240. These components may be in electronic communication or otherwise coupled (such as operatively, communicatively, functionally, electronically, electrically) via one or more buses (such as a bus 1245).

The I/O controller 1210 may manage input and output signals for the device 1205. The I/O controller 1210 also may manage peripherals not integrated into the device 1205. In some implementations, the I/O controller 1210 may represent a physical connection or port to an external peripheral. In some implementations, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some implementations, the I/O controller 1210 may be implemented as part of one or more processors, such as the at least one processor 1240. In some implementations, a user may interact with the device 1205 via the I/O controller 1210 or via hardware components controlled by the I/O controller 1210.

In some implementations, the device 1205 may include a single antenna. However, in some other implementations, the device 1205 may have more than one antenna, which may be capable of concurrently transmitting or receiving multiple wireless transmissions. The transceiver 1215 may communicate bi-directionally via the one or more antennas 1225 using wired or wireless links as described herein. For example, the transceiver 1215 may represent a wireless transceiver and may communicate bi-directionally with another wireless transceiver. The transceiver 1215 also may include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter, a receiver, or any combination thereof or component thereof, as described herein.

The at least one memory 1230 may include random access memory (RAM) and read-only memory (ROM). The at least one memory 1230 may store computer-readable, computer-executable, or processor-executable code, such as the code 1235. The code 1235 may include instructions that, when executed by the at least one processor 1240, cause the device 1205 to perform various functions described herein. The code 1235 may be stored in a non-transitory computer-readable medium such as system memory or another type of memory. In some implementations, the code 1235 may not be directly executable by the at least one processor 1240 but may cause a computer (such as when compiled and executed) to perform functions described herein. In some implementations, the at least one memory 1230 may include, among other things, a basic I/O system (BIOS) which may control basic hardware or software operation such as the interaction with peripheral components or devices.

The at least one processor 1240 may include one or more intelligent hardware devices (such as one or more general-purpose processors, one or more digital signal processor (DSP) s, one or more CPUs, one or more graphics processing units (GPUs), one or more neural processing units (NPUs) (also referred to as neural network processors or deep learning processors (DLPs)), one or more microcontrollers, one or more application-specific integrated circuit (ASIC) s, one or more field-programmable gate array (FPGA) s, one or more programmable logic devices, discrete gate or transistor logic, one or more discrete hardware components, or any combination thereof). In some implementations, the at least one processor 1240 may be configured to operate a memory array using a memory controller. In some other implementations, a memory controller may be integrated into the at least one processor 1240. The at least one processor 1240 may be configured to execute computer-readable instructions stored in a memory (such as the at least one memory 1230) to cause the device 1205 to perform various functions (such as functions or tasks supporting use case aware network traffic shaping techniques for power reduction). For example, the device 1205 or a component of the device 1205 may include at least one processor 1240 and at least one memory 1230 coupled with or to the at least one processor 1240, the at least one processor 1240 and the at least one memory 1230 configured to perform various functions described herein.

In some examples, the at least one processor 1240 may include multiple processors and the at least one memory 1230 may include multiple memories. One or more of the multiple processors may be coupled with one or more of the multiple memories, which may, individually or collectively, be configured to perform various functions described herein.

In some examples, the at least one processor 1240 may be a component of a processing system, which may refer to a system (such as a series) of machines, circuitry (including, for example, one or both of processor circuitry (which may include the at least one processor 1240) and memory circuitry (which may include the at least one memory 1230)), or components, that receives or obtains inputs and processes the inputs to produce, generate, or obtain a set of outputs. The processing system may be configured to perform one or more of the functions described herein. For example, the at least one processor 1240 or a processing system including the at least one processor 1240 may be configured to, configurable to, or operable to cause the device 1205 to perform one or more of the functions described herein. Further, as described herein, being "configured to," being "configurable to," and being "operable to" may be used interchangeably and may be associated with a capability, when executing code 1235 (such as processor-executable code) stored in the at least one memory 1230 or otherwise, to perform one or more of the functions described herein.

The communications manager 1220 may support wireless communications in accordance with examples as disclosed herein. For example, the communications manager 1220 is capable of, configured to, or operable to support a means for aligning a set of transmission periodicities associated with a set of transmission types to a common periodicity. The communications manager 1220 is capable of, configured to, or operable to support a means for buffing one or more transmissions of a set of multiple transmissions corresponding to the set of transmission types prior to performing packetization associated with at least one transmission of the set of multiple transmissions. The communications manager 1220 is capable of, configured to, or operable to support a means for transmitting the set of multiple transmissions at the common periodicity via a single frame based on performing the packetization associated with the set of multiple transmissions.

In some examples, the communications manager 1220 may be configured to perform various operations (such as receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of use case aware network traffic shaping techniques for power reduction as described herein, or the at least one processor 1240 and the at least one memory 1230 may be otherwise configured to, individually or collectively, perform or support such operations.

FIG. 13 shows a flowchart illustrating a method 1300 that supports use case aware network traffic shaping techniques for power reduction. The operations of the method 1300 may be implemented by an AR device or its components as described herein. For example, the operations of the method 1300 may be performed by an AR device (e.g., a wireless device) as described with reference to FIGS. 1 through 10. In some examples, an AR device may execute a set of instructions to control the functional elements of the AR device to perform the described functions. Additionally, or alternatively, the AR device may perform aspects of the described functions using special-purpose hardware.

At 1305, the method may include aligning a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type based on the common periodicity, where the master transmission type is associated with a smallest threshold latency tolerance of the set of transmission types. The operations of 1305 may be performed in accordance with examples as disclosed herein, such as at 810 of FIG. 8. In some examples, aspects of the operations of 1305 may be performed by a periodicity alignment component 925 as described with reference to FIG. 9.

At 1310, the method may include transmitting one or more transmissions corresponding to one or more respective transmission types of the set of transmission types at the common periodicity and according to the smallest threshold latency tolerance. The operations of 1310 may be performed in accordance with examples as disclosed herein, such as at 825 of FIG. 8. In some examples, aspects of the operations of 1310 may be performed by a periodicity alignment component 925 as described with reference to FIG. 9.

FIG. 14 shows a flowchart illustrating a method 1400 that supports use case aware network traffic shaping techniques for power reduction. The operations of the method 1400 may be implemented by a UE or its components as described herein. For example, the operations of the method 1400 may be performed by a UE 115 as described with reference to FIGS. 1 through 8 and 11 and 12. In some examples, a UE may execute a set of instructions to control the functional elements of the UE to perform the described functions. Additionally, or alternatively, the UE may perform aspects of the described functions using special-purpose hardware.

At 1405, the method may include aligning a set of transmission periodicities associated with a set of transmission types to a common periodicity. In some examples, a packet size associated with a transmissions type is based on a latency threshold associated with the transmission type. The operations of 1405 may be performed in accordance with examples as disclosed herein, such as at 810 of FIG. 8. In some examples, aspects of the operations of 1405 may be performed by a periodicity alignment component 1125 as described with reference to FIG. 11.

At 1410, the method may include buffering one or more transmissions of a set of multiple transmissions corresponding to the set of transmission types prior to performing packetization associated with at least one transmission of the set of multiple transmissions. The operations of 1410 may be performed in accordance with examples as disclosed herein, such as at 815 of FIG. 8. In some examples, aspects of the operations of 1410 may be performed by a buffer component 1130 as described with reference to FIG. 11.

At 1415, the method may include transmitting the set of multiple transmissions at the common periodicity via a single frame based on performing the packetization associated with the set of multiple transmissions. The operations of 1415 may be performed in accordance with examples as disclosed herein, such as at 820 of FIG. 8. In some examples, aspects of the operations of 1415 may be performed by a periodicity alignment component 1125 as described with reference to FIG. 11.

The following provides an overview of some aspects of the present disclosure:

Aspect 1: A method by an wireless device, including:
aligning a set of transmission periodicities associated with a set of transmission types to a common periodicity corresponding to a master transmission type of the set of transmission types based on a modification to at least one transmission periodicity of the set of transmission periodicities, where a threshold latency tolerance associated with the master transmission type is based on the common periodicity, where the master transmission type is associated with a smallest threshold latency tolerance of the set of transmission types; and transmitting one or more transmissions corresponding to one or more respective transmission types of the set of transmission types at the common periodicity and according to the smallest threshold latency tolerance.

Aspect 2: The method of aspect 1, where transmitting the one or more transmissions further includes: generating first data associated with the master transmission type, where a first transmission of the one or more transmissions includes the first data, where transmitting the one or more transmissions includes transmitting the first data associated with the master transmission type and at least second data associated with a second transmission type of the set of transmission types at a transmission timing corresponding to the first data.

Aspect 3: The method of any of aspects 1 through 2, further including: identifying one or more threshold latency tolerances associated with each transmission type of the set of transmission types; and transmitting an additional transmission corresponding to a first transmission type of the one or more respective transmission types based on a determination that a respective threshold latency tolerance of the one or more threshold latency tolerances associated with the first transmission type of the one or more respective transmission types has been exceeded.

Aspect 4: The method of any of aspects 1 through 3, further including: synchronizing the one or more transmissions corresponding to the one or more respective transmission types based on a data availability associated with the master transmission type, where the one or more transmissions are phase aligned based on the synchronizing.

Aspect 5: The method of any of aspects 1 through 4, further including: merging concurrent data corresponding to the one or more transmissions into a single message, where transmitting the one or more transmissions includes transmitting the single message.

Aspect 6: The method of any of aspects 1 through 5, where a packet size associated with the one or more transmissions is based on a threshold transmit unit size, and the packet size does not exceed the threshold transmit unit size.

Aspect 7: The method of any of aspects 1 through 6, where transmitting the one or more transmissions further includes: transmitting the one or more transmissions via a single Wi-Fi frame.

Aspect 8: The method of any of aspects 1 through 7, further including: increasing the smallest threshold latency tolerance associated with the master transmission type based on a deep learning based prediction model output corresponding to the master transmission type.

Aspect 9: The method of any of aspects 1 through 8, further including: adjusting data generation timing associated with a subset of transmission types to align with a transmission time associated with the master transmission type based on the common periodicity, where transmitting the one or more transmissions associated with the subset of transmission types at the common periodicity is based on the adjusted data generation timing.

Aspect 10: The method of aspect 9, where adjusting the transmission time further includes: buffering data associated with the subset of transmission types prior to a transmission corresponding to the master transmission type, where transmitting the one or more transmissions at the common periodicity is based on the buffering.

Aspect 11: The method of any of aspects 1 through 10, where the master transmission type corresponds to positional data associated with the wireless device.

Aspect 12: A method by a UE, including: aligning a set of transmission periodicities associated with a set of transmission types to a common periodicity; buffing one or more transmissions of a plurality of transmissions corresponding to the set of transmission types prior to performing packetization associated with at least one transmission of the plurality of transmissions; and transmitting the plurality of transmissions at the common periodicity via a single frame based on performing the packetization associated with the plurality of transmissions.

Aspect 13: The method of aspect 12, where transmitting the plurality of transmissions at the common periodicity further includes: performing a socket write for each transmission of the plurality of transmissions simultaneously.

Aspect 14: The method of any of aspects 12 through 13, where the packet size is based on a threshold transmit unit size, and the packet size does not exceed the threshold transmit unit size.

Aspect 15: The method of any of aspects 12 through 14, where processing associated with each transmission of the plurality of transmissions is assigned a dedicated CPU core.

Aspect 16: The method of any of aspects 12 through 15, where the at least one transmission of the plurality of transmissions corresponds to a transmission type associated with video data.

Aspect 17: The method of any of aspects 12 through 16, where the single frame is a single Wi-Fi frame.

Aspect 18: The method of any of aspects 12 through 17, where a packet size associated with a transmission type is based on a latency threshold associated with the transmission type.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, and the like. Also, "determining" can include receiving (such as receiving information), accessing (such as accessing data stored in memory) and the like. Also, "determining" can include resolving, selecting, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented using hardware or software depends upon the particular application and design constraints imposed on the overall system.

The hardware and data processing apparatus used to implement the various illustrative logics, logical blocks, modules and circuits described in connection with the aspects disclosed herein may be implemented or performed using a general purpose single- or multi-chip processor, a digital signal processor (DSP), an application specific integrated circuit (ASIC), a graphics processing unit (GPU), a neural processing unit (NPU), a field programmable gate array (FPGA) or other programmable logic device, discrete gate or transistor logic, discrete hardware components, or any combination thereof designed to perform the functions described herein. A general-purpose processor may be a microprocessor, or any processor, controller, microcontroller, or state machine. A processor also may be implemented as a combination of computing devices, such as a combination of a DSP and a microprocessor, a set of microprocessors, one or more microprocessors in conjunction with a DSP core, or any other such configuration. In some implementations, particular processes and methods may be performed by circuitry that is specific to a given function.

In one or more aspects, the functions described may be implemented using hardware, digital electronic circuitry, computer software, firmware, including the structures disclosed in this specification and their structural equivalents thereof, or in any combination thereof. Implementations of the subject matter described in this specification also can be implemented as one or more computer programs, such as one or more modules of computer program instructions, encoded on a computer storage media for execution by, or to control the operation of, data processing apparatus.

If implemented in software, the functions may be stored on or transmitted using one or more instructions or code of a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one location to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc. Disks may reproduce data magnetically and discs may reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in some combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some implementations, the actions recited in the claims can be performed in a different order and still achieve desirable results.

What is claimed is:

1. A wireless device, comprising:
a processing system that includes processor circuitry and memory circuitry that stores code, the processing system configured to cause the wireless device to:
    align a set of transmission periodicities associated with a set of transmission types to a common periodicity corresponding to a master transmission type of the set of transmission types based at least in part on a modification to at least one transmission periodicity of the set of transmission periodicities, wherein a threshold latency tolerance associated with the master transmission type is based at least in part on the common periodicity, wherein the master transmission type is associated with a smallest threshold latency tolerance of the set of transmission types; and
    transmit one or more transmissions corresponding to one or more respective transmission types of the set of transmission types at the common periodicity and according to the smallest threshold latency tolerance.

2. The wireless device of claim 1, wherein, to transmit the one or more transmissions, the processing system is further configured to cause the wireless device to:
    generate first data associated with the master transmission type, wherein a first transmission of the one or more transmissions comprises the first data, wherein transmitting the one or more transmissions comprises transmitting the first data associated with the master transmission type and at least second data associated with a second transmission type of the set of transmission types at a transmission timing corresponding to the first data.

3. The wireless device of claim 1, wherein the processing system is further configured to cause the wireless device to:
    identify one or more threshold latency tolerances associated with each transmission type of the set of transmission types; and
    transmit an additional transmission corresponding to a first transmission type of the one or more respective transmission types based at least in part on a determination that a respective threshold latency tolerance of the one or more threshold latency tolerances associated with the first transmission type of the one or more respective transmission types has been exceeded.

4. The wireless device of claim 1, wherein the processing system is further configured to cause the wireless device to:
    synchronize the one or more transmissions corresponding to the one or more respective transmission types based at least in part on a data availability associated with the master transmission type, wherein the one or more transmissions are phase aligned based at least in part on the synchronizing.

5. The wireless device of claim 1, wherein the processing system is further configured to cause the wireless device to:
    merge concurrent data corresponding to the one or more transmissions into a single message, wherein transmitting the one or more transmissions comprises transmitting the single message.

6. The wireless device of claim 1, wherein:
    a packet size associated with the one or more transmissions is based at least in part on a threshold transmit unit size, and
    the packet size does not exceed the threshold transmit unit size.

7. The wireless device of claim 1, wherein, to transmit the one or more transmissions, the processing system is further configured to cause the wireless device to:
    transmit the one or more transmissions via a single Wi-Fi frame.

8. The wireless device of claim 1, wherein the processing system is further configured to cause the wireless device to:
    increase the smallest threshold latency tolerance associated with the master transmission type based at least in part on a deep learning based prediction model output corresponding to the master transmission type.

9. The wireless device of claim 1, wherein the processing system is further configured to cause the wireless device to:
    adjust data generation timing associated with a subset of transmission types to align with a transmission time associated with the master transmission type based at least in part on the common periodicity, wherein transmitting the one or more transmissions associated with the subset of transmission types at the common periodicity is based at least in part on the adjusted data generation timing.

10. The wireless device of claim 9, wherein, to align the transmission time, the processing system is further configured to cause the wireless device to:
    buffer data associated with the subset of transmission types prior to a transmission corresponding to the master transmission type, wherein transmitting the one or more transmissions at the common periodicity is based at least in part on the buffering.

11. The wireless device of claim 1, wherein the master transmission type corresponds to positional data associated with the wireless device.

12. A user equipment (UE), comprising:
a processing system that includes processor circuitry and memory circuitry that stores code, the processing system configured to cause the UE to:
    align a set of transmission periodicities associated with a set of transmission types to a common periodicity;
    buffer one or more transmissions of a plurality of transmissions corresponding to the set of transmission types prior to performing packetization associated with at least one transmission of the plurality of transmissions; and
    transmit the plurality of transmissions at the common periodicity via a single frame based at least in part on performing the packetization associated with the plurality of transmissions.

13. The UE of claim 12, wherein, to transmit the plurality of transmissions at the common periodicity, the processing system is further configured to cause the UE to:
    perform a socket write for each transmission of the plurality of transmissions simultaneously.

14. The UE of claim 12, wherein a packet size associated with a transmission type of the set of transmission types is based at least in part on a latency threshold associated with the transmission type.

15. The UE of claim 14, wherein:
    the packet size is based at least in part on a threshold transmit unit size, and
    the packet size does not exceed the threshold transmit unit size.

16. The UE of claim 12, wherein processing associated with each transmission of the plurality of transmissions is assigned a dedicated central processing unit core.

17. The UE of claim 12, wherein the at least one transmission of the plurality of transmissions corresponds to a transmission type associated with video data.

18. The UE of claim 12, wherein the single frame is a single Wi-Fi frame.

19. A method for wireless communications at a wireless device, comprising:

aligning a set of transmission periodicities associated with a set of transmission types to a common periodicity corresponding to a master transmission type of the set of transmission types based at least in part on a modification to at least one transmission periodicity of the set of transmission periodicities, wherein a threshold latency tolerance associated with the master transmission type is based at least in part on the common periodicity, wherein the master transmission type is associated with a smallest threshold latency tolerance of the set of transmission types; and transmitting one or more transmissions corresponding to one or more respective transmission types of the set of transmission types at the common periodicity and according to the smallest threshold latency tolerance.

20. The method of claim 19, wherein transmitting the one or more transmissions further comprises:

generating first data associated with the master transmission type, wherein a first transmission of the one or more transmissions comprises the first data, wherein transmitting the one or more transmissions comprises transmitting the first data associated with the master transmission type and at least second data associated with a second transmission type of the set of transmission types at a transmission timing corresponding to the first data.

21. The method of claim 19, further comprising:

identifying one or more threshold latency tolerances associated with each transmission type of the set of transmission types; and transmitting an additional transmission corresponding to a first transmission type of the one or more respective transmission types based at least in part on a determination that a respective threshold latency tolerance of the one or more threshold latency tolerances associated with the first transmission type of the one or more respective transmission types has been exceeded.

22. The method of claim 19, further comprising:

synchronizing the one or more transmissions corresponding to the one or more respective transmission types based at least in part on a data availability associated with the master transmission type, wherein the one or more transmissions are phase aligned based at least in part on the synchronizing.

23. The method of claim 19, further comprising:

merging concurrent data corresponding to the one or more transmissions into a single message, wherein transmitting the one or more transmissions comprises transmitting the single message.

24. The method of claim 19, wherein:

a packet size associated with the one or more transmissions is based at least in part on a threshold transmit unit size, and the packet size does not exceed the threshold transmit unit size.

25. The method of claim 19, wherein transmitting the one or more transmissions further comprises:

transmitting the one or more transmissions via a single Wi-Fi frame.

26. The method of claim 19, further comprising:

increasing the smallest threshold latency tolerance associated with the master transmission type based at least in part on a deep learning based prediction model output corresponding to the master transmission type.

27. The method of claim 19, further comprising:

adjusting data generation timing associated with a subset of transmission types to align with a transmission time associated with the master transmission type based at least in part on the common periodicity, wherein transmitting the one or more transmissions associated with the subset of transmission types at the common periodicity is based at least in part on the adjusted data generation timing.

28. The method of claim 27, wherein adjusting the transmission time further comprises:

buffering data associated with the subset of transmission types prior to a transmission corresponding to the master transmission type, wherein transmitting the one or more transmissions at the common periodicity is based at least in part on the buffering.

29. The method of claim 19, wherein the master transmission type corresponds to positional data associated with the wireless device.

30. A method for wireless communications at a user equipment (UE), comprising:

aligning a set of transmission periodicities associated with a set of transmission types to a common periodicity;

buffering one or more transmissions of a plurality of transmissions corresponding to the set of transmission types prior to performing packetization associated with at least one transmission of the plurality of transmissions; and transmitting the plurality of transmissions at the common periodicity via a single frame based at least in part on performing the packetization associated with the plurality of transmissions.

* * * * *